(12) United States Patent
Lu et al.

(10) Patent No.: US 11,298,690 B2
(45) Date of Patent: Apr. 12, 2022

(54) CATALYST AND A WASTEWATER TREATMENT METHOD

(71) Applicant: City University of Hong Kong, Kowloon (HK)

(72) Inventors: Jian Lu, Kowloon (HK); Zhe Jia, Kowloon (HK); Qing Wang, Kowloon (HK)

(73) Assignee: City University of Hong Kong, Kowloon (HK)

(*) Notice: Subject to any disclaimer, the term of this patent is extended or adjusted under 35 U.S.C. 154(b) by 157 days.

(21) Appl. No.: 16/448,218

(22) Filed: Jun. 21, 2019

(65) Prior Publication Data

US 2020/0398257 A1 Dec. 24, 2020

(51) Int. Cl.
*B01J 27/185* (2006.01)
*C02F 1/72* (2006.01)
(Continued)

(52) U.S. Cl.
CPC ....... *B01J 27/1853* (2013.01); *B01J 35/0013* (2013.01); *B01J 37/0081* (2013.01);
(Continued)

(58) Field of Classification Search
CPC .. B01J 27/182; B01J 27/1853; B01J 35/0013; B01J 37/0081; B01J 21/02; B01J 2523/305; B01J 2523/41; B01J 2523/51; B01J 2523/842; C02F 1/722; C02F 1/725; C02F 2101/30; C02F 2103/30; C02F 2103/343; C02F 2305/026
(Continued)

(56) References Cited

U.S. PATENT DOCUMENTS

| 4,727,202 A * | 2/1988 | Franzen | ................... B01J 35/02 585/259 |
| 5,876,519 A * | 3/1999 | Inoue | .................. H01F 1/15308 148/304 |

(Continued)

FOREIGN PATENT DOCUMENTS

| CN | 10 1805876 | * | 8/2010 | ............... C22C 1/03 |
| CN | 10 2383069 | * | 3/2012 | ............... C02F 1/00 |

(Continued)

OTHER PUBLICATIONS

Shuang-Qin Chen et al., "Influence of inorganic ions on degradation capability of Fe-based metallic glass towards dyeing wastewater remediation." Chemosphere 264, pp. 1-11 (Year: 2020).*

*Primary Examiner* — Patricia L. Hailey
(74) *Attorney, Agent, or Firm* — Renner Kenner Greive Bobak Taylor & Weber

(57) ABSTRACT

A catalyst including an amorphous matrix of a metallic glass including iron and phosphorous; wherein when the catalyst performs a catalytic reaction with a reactant, the metallic glass catalyst activates at least some of the reactant, and at least a portion of the catalyst at a surface of the metallic glass matrix transforms to a surface layer including a material property different from that of the metallic glass matrix being covered by the surface layer; and wherein the surface layer is arranged to maintain an amorphous structure of the metallic glass matrix and to facilitate the catalytic reaction to occur at the surface layer.

23 Claims, 33 Drawing Sheets

(51) Int. Cl.
*B01J 35/00* (2006.01)
*B01J 37/00* (2006.01)
*C02F 103/34* (2006.01)
*C02F 103/30* (2006.01)
*C02F 101/30* (2006.01)

(52) U.S. Cl.
CPC .............. *C02F 1/722* (2013.01); *C02F 1/725* (2013.01); *C02F 2101/30* (2013.01); *C02F 2103/30* (2013.01); *C02F 2103/343* (2013.01); *C02F 2305/026* (2013.01)

(58) Field of Classification Search
USPC ........ 502/185, 213, 214, 258; 148/540, 545; 420/8, 9, 14, 87, 88, 121
See application file for complete search history.

(56) References Cited

U.S. PATENT DOCUMENTS

| | | | |
|---|---|---|---|
| 7,090,733 B2* | 8/2006 | Munir | C22C 45/00 |
| | | | 148/561 |
| 7,815,753 B2* | 10/2010 | Yi | C22C 45/02 |
| | | | 148/304 |
| 2003/0051781 A1* | 3/2003 | Branagan | C22C 38/22 |
| | | | 148/561 |
| 2014/0045680 A1* | 2/2014 | Nakayama | B01J 23/44 |
| | | | 502/100 |

FOREIGN PATENT DOCUMENTS

| WO | WO 2013/065637 | * | 5/2013 | ............. C22C 45/02 |
|---|---|---|---|---|
| WO | WO 2018/000795 | * | 1/2018 | ............. C25B 11/04 |

* cited by examiner

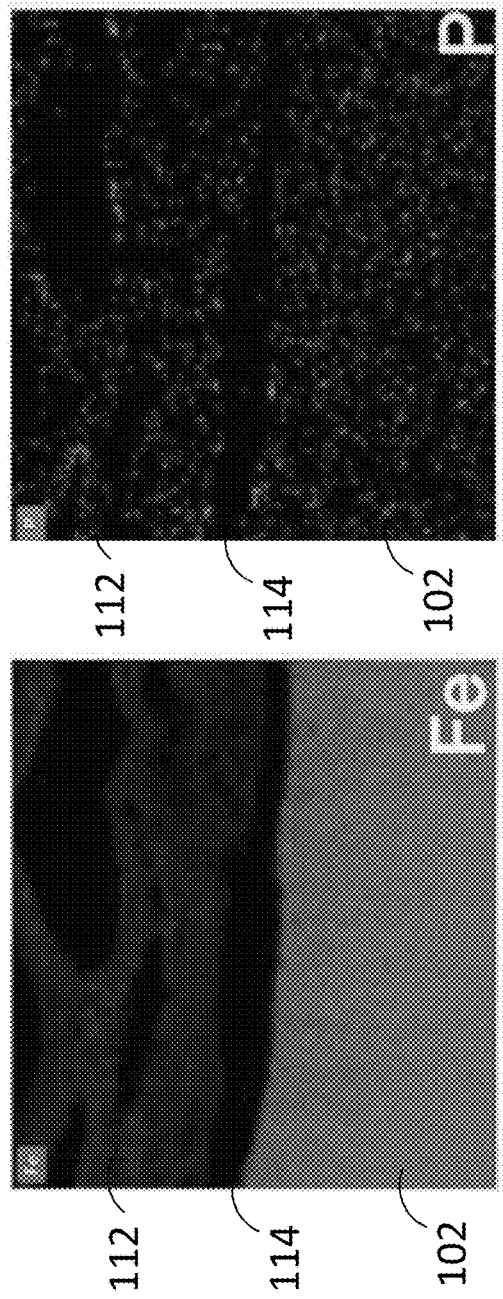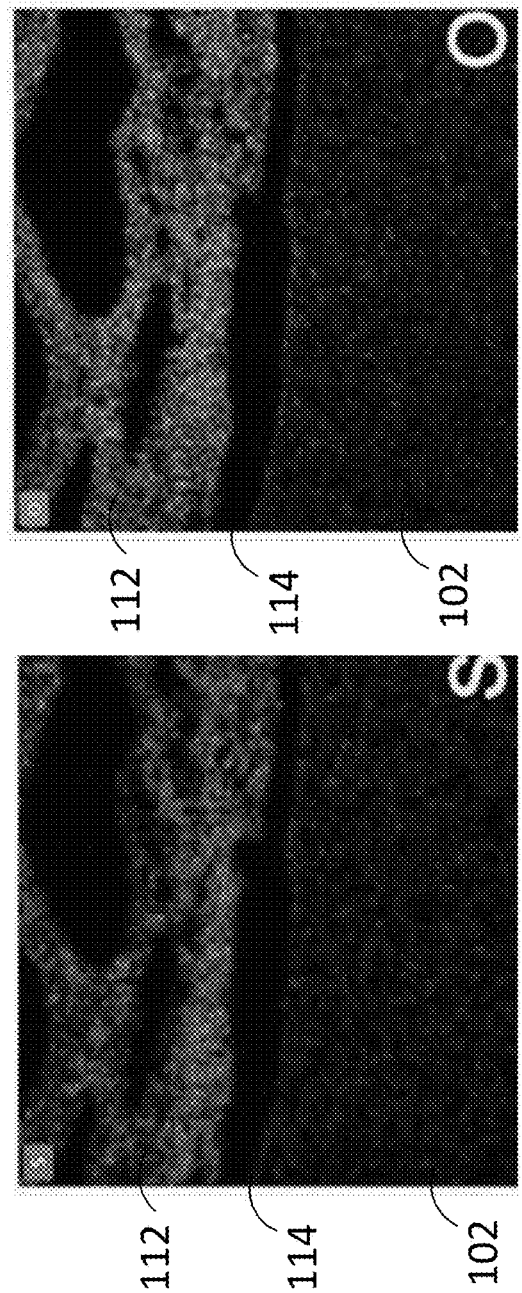
Figure 12A Figure 12B Figure 12C Figure 12D

CATALYST AND A WASTEWATER TREATMENT METHOD

TECHNICAL FIELD

This present invention relates to a catalyst and a wastewater treatment method, and particularly, although not exclusively, to a catalyst having an amorphous matrix for use in industrial wastewater treatment.

BACKGROUND

Contamination occurring in aqueous-based solutions has become a serious concern over a long time. In particular, problems associated with the disposal of industrial wastewater have been drawing attentions. The substances in industrial wastewater may include organic matter and toxic pollutants posing negative impacts to the environment. The release of inadequately treated wastewater into natural water bodies may lead to degradation of aquatic ecosystems as well as public health problems.

Various methods may be used to treat wastewater. For example, before discharging of wastewater, a catalyst may be used to improve the efficiency to remove contaminants from wastewater and convert the contaminants into non-toxic substances that can be returned to the water cycle.

SUMMARY OF THE INVENTION

In accordance with a first aspect of the present invention, there is provided a catalyst comprising a metallic glass matrix comprising iron and phosphorous; wherein when the catalyst performs a catalytic reaction with a reactant, the metallic glass activates at least some of the reactant, and at least a portion of the catalyst at a surface of the metallic glass matrix transforms to a surface layer including a material property different from that of the metallic glass matrix being covered by the surface layer; and wherein the surface layer is arranged to maintain an amorphous structure of the metallic glass matrix and to facilitate the catalytic reaction and stability to occur at the surface layer.

In an embodiment of the first aspect, the catalyst has a mainly amorphous phase.

In an embodiment of the first aspect, the catalyst may have a trace of small nanocrystalline phase, or crystalline phase that is of nano-scale.

In an embodiment of the first aspect, an atomic component of the catalyst is iron-based.

In an embodiment of the first aspect, the atomic component of the catalyst at least comprises phosphorus.

In an embodiment of the first aspect, the atomic component of the catalyst is in the range of iron (60-85%), silicon (0-20%), boron (0-20%), phosphorus (1-20%) and carbon (0-10%).

In an embodiment of the first aspect, the material structure of the surface layer includes at least a porous structure being transformed during the catalytic reaction, such as during a wastewater treatment process.

In an embodiment of the first aspect, the porous structure may include a nanocrystalline phase.

In an embodiment of the first aspect, the porous structure is arranged to facilitate chemical reactants to pass therethrough.

In an embodiment of the first aspect, the material property includes a material composition.

In an embodiment of the first aspect, the surface layer has iron content lower than that in the metallic glass matrix.

In an embodiment of the first aspect, the surface layer further has oxide content higher than that in the metallic glass matrix.

In an embodiment of the first aspect, the material composition gradually changes from the portion of the metallic glass matrix to a portion of the surface layer.

In an embodiment of the first aspect, the surface layer comprises a top cover layer and an interlayer formed between the top cover layer and the metallic glass matrix.

In an embodiment of the first aspect, the interlayer includes a dense amorphous structure with an atomic density higher than that of the top cover layer includes the porous structure.

In an embodiment of the first aspect, the interlayer includes a plurality of adsorption sites arranged to facilitate the catalytic reaction to occur at.

In an embodiment of the first aspect, the plurality of adsorption sites includes a plurality of Fe sites each containing a first or a second neighbor of P atom.

In an embodiment of the first aspect, the catalyst further comprises a substantially flat shape.

In an embodiment of the first aspect, the reactant includes a treatment reagent and a target substance to be treated by the treatment reagent, and wherein the target substance is treated by the treatment reagent upon the metallic glass matrix activates the treatment reagent.

In an embodiment of the first aspect, the metallic glass matrix activates the treatment reagent by transforming the treatment reagent to radicals of the treatment reagent.

In an embodiment of the first aspect, the treatment reagent includes a persulfate and/or a peroxymonosulfate.

In an embodiment of the first aspect, treating the target substance by the activated treatment reagent occurs at the surface layer.

In an embodiment of the first aspect, the target substance includes waste water pollutants.

In accordance with a second aspect of the present invention, there is provided a method of fabricating a catalyst, comprising the steps of: melting an alloy comprising iron and phosphorous; and melt-spinning the melted alloy to form an amorphous structure of the metallic glass catalyst.

In an embodiment of the second aspect, the step of melting the alloy comprises arc-melting the alloy.

In an embodiment of the second aspect, the step of melt-spinning the melted alloy comprises further melting the melted alloy in a quartz crucible.

In an embodiment of the second aspect, the melted alloy is further melted under a temperature of 1200 to 1500° C.

In an embodiment of the second aspect, the step of melt-spinning the melted alloy further comprises ejecting the further melted alloy onto a rotated copper roll surface.

In an embodiment of the second aspect, the further melted alloy is ejected onto the rotated copper roll surface with a speed of 23 to 39 $ms^{-1}$.

In an embodiment of the second aspect, the method further comprises the step of rapid quenching the further melted alloy ejected onto the rotated copper roll surface.

In an embodiment of the second aspect, an atomic component of the alloy is iron-based.

In an embodiment of the second aspect, the atomic component of the alloy at least comprises phosphorus.

In an embodiment of the second aspect, the atomic component of the alloy is in the range of iron (60-85%), silicon (0-20%), boron (0-20%), phosphorus (1-20%) and carbon (0-10%).

In an embodiment of the second aspect, the catalyst comprises a substantially flat shape.

In an embodiment of the second aspect, the catalyst is 10-80 μm in thickness.

In an embodiment of the second aspect, the catalyst is used in industrial wastewater treatment.

BRIEF DESCRIPTION OF THE DRAWINGS

Embodiments of the present invention will now be described, by way of example, with reference to the accompanying drawings in which:

FIG. 12A shows elemental mapping results of Fe in the reused $Fe_{83}Si_2B_{11}P_3C_1$ catalyst of FIG. 8;

FIG. 12B shows elemental mapping results of P in the reused $Fe_{83}Si_2B_{11}P_3C_1$ catalyst of FIG. 8;

FIG. 12C shows elemental mapping results of S in the reused $Fe_{83}Si_2B_{11}P_3C_1$ catalyst of FIG. 8;

FIG. 12D shows elemental mapping results of O in the reused $Fe_{83}Si_2B_{11}P_3C_1$ catalyst of FIG. 8;

DETAILED DESCRIPTION OF THE PREFERRED EMBODIMENT

The inventors have, through their own research, trials and experiments, devised that metallic glasses (MGs), also known as amorphous alloys or non-crystalline alloys, may be of great practical importance in global environmental and energy fields. Compared with crystalline materials, such as industrial Fenton or Fenton-like catalysts, the short-range ordered atomic arrangement in MGs provides many advantages owing to their atomic coordination, and the long-range disordered atomic arrangement in MGs enables their homogeneous and isotropic structures, thus greatly avoiding the structural defects in their crystalline counterparts. In addition, MGs also include several intrinsic catalytic advantages that may be utilized in different catalytic applications.

The inventors have devised that some example Fenton/Fenton-like catalysts may be in ion or powder state with a crystalline structure (e.g., ferrous or ferric ion, zero valent iron powders, crystalline iron oxides powders), which result in a limited efficiency and reusability, and more importantly, the produced iron sludge secondary pollution have gradually become a main impediment to their rapid development in industrial technologies.

Another disadvantage of some MG catalysts is that their high catalytic efficiency may be accompanied by low stability and the disordered atomic configurations, as well as the structural evolution, affecting the catalytic performance, and raising a primary obstacle for their widespread applications.

In one example embodiment of the present invention, there is provided an embodiment of a catalyst that may be directly employed as an environmental catalyst for wastewater remediation without any additional conditions (e.g., temperature, UV/Vis irradiation, and electric field), but only a slight addition of persulfate (PS) for triggering the catalytic reaction process. Compared to the aforementioned Fenton/Fenton-like catalysts, the present invention provides enhanced efficiency and reusability, and demonstrates great advances in the aspects of green, facile, low-cost, and efficient wastewater remediation.

Figures 1A, 1B:
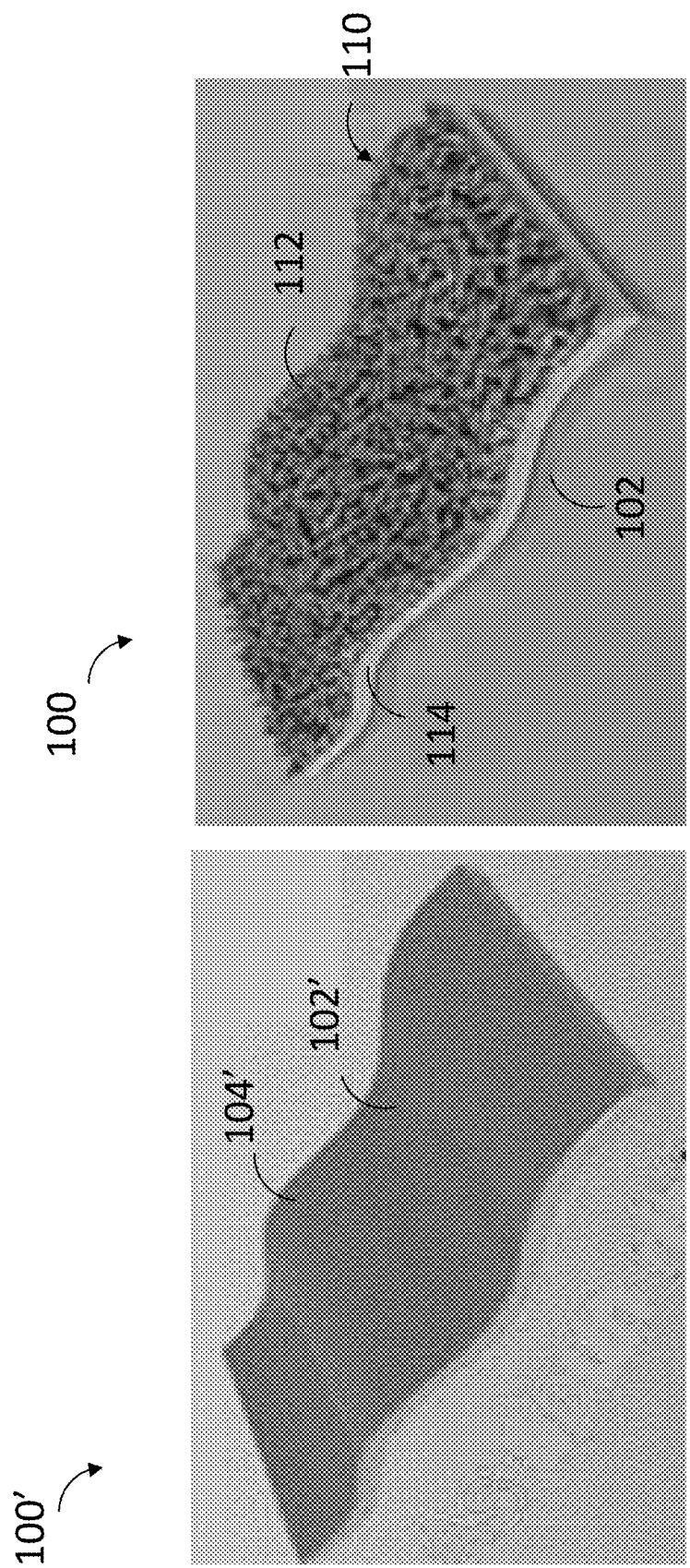
FIG. 1A is a schematic diagram of a catalyst having an amorphous matrix in accordance with one embodiment of the present invention.
FIG. 1B is a schematic diagram showing the structure of the catalyst of FIG. 1A after performing a catalytic reaction with a reactant.

With reference to FIGS. 1A and 1B, there is provided an embodiment of a catalyst 100 comprising a metallic glass matrix 102 of an alloy 104 comprising iron (Fe) and phosphorous (P); wherein when the catalyst 100 performs a catalytic reaction with a reactant, the metallic glass matrix 102 activates at least some of the reactant, and at least a portion of the alloy 104 at a surface of the metallic glass matrix 102 transforms to a surface layer 110 including a material property different from that of the metallic glass matrix 102 being covered by the surface layer 110; and wherein the surface layer 110 is arranged to maintain an amorphous structure of the metallic glass matrix 102 and to facilitate the catalytic reaction to occur at the surface layer 110.

In this embodiment, referring to FIG. 1A, a freshly prepared catalyst 100', which includes a metallic glass matrix 102' in a ribbon glass state with a smooth surface and a substantially flat shape, may be used for waste water treatments. After an initial catalytic process performed, referring also to FIG. 1B, the fresh prepared catalyst 100 may structurally/chemically changes or transforms to a reused catalyst 100 with a surface layer 110 covering the metallic glass matrix 102. Specifically, the surface layer 110 includes a top cover layer 112 and an interlayer 114 formed between the top cover layer 112 and the metallic glass matrix 102, which are gradually self-reconstructed under catalytic conditions.

Figure 2:
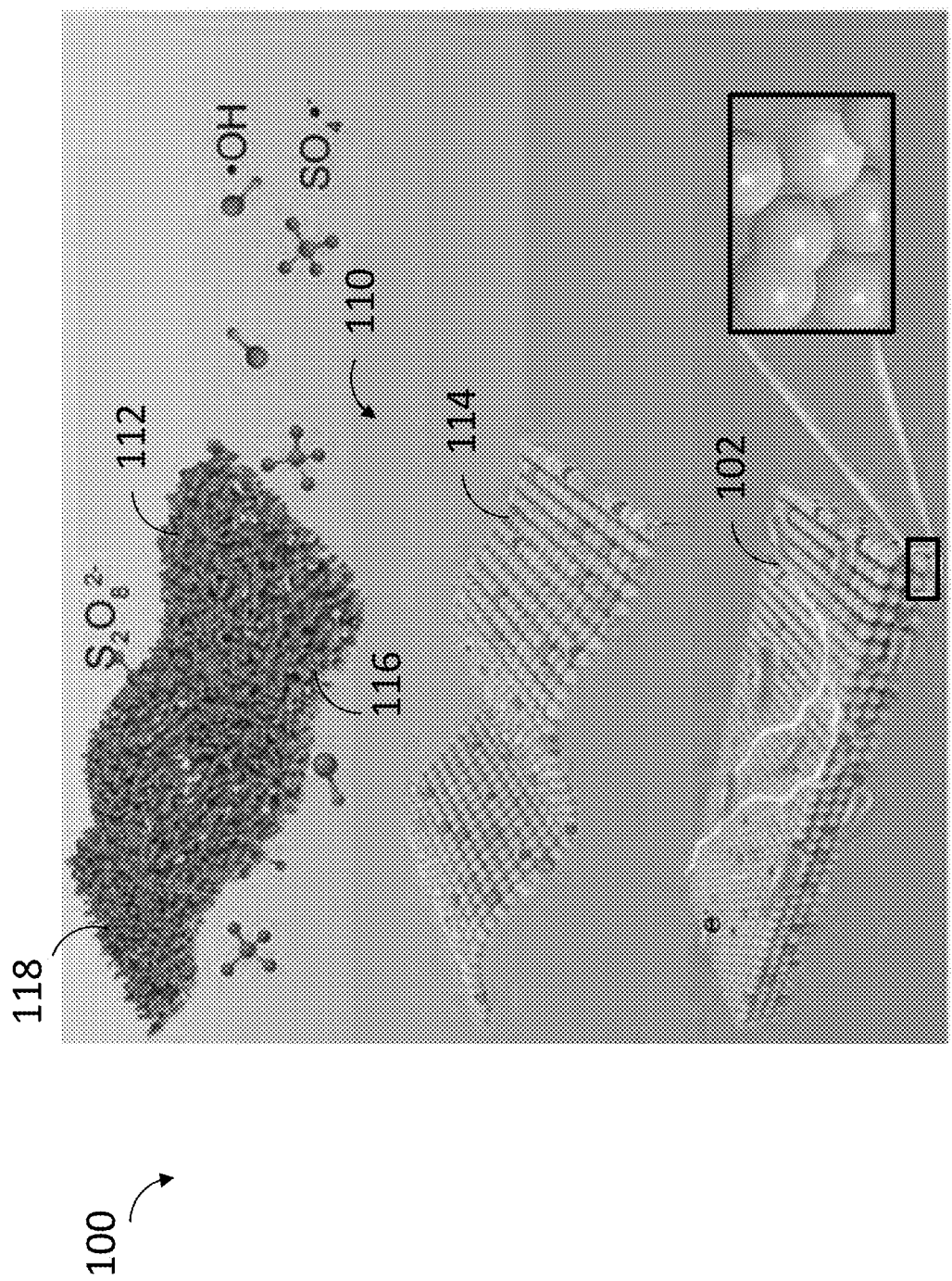
FIG. 2 is a schematic diagram showing the structures of a top cover layer, an interlayer, and the metallic glass matrix of the catalyst of FIG. 1B.

The aforesaid material property of the surface layer 110 may include a material structure of at least a porous structure 116. As more clearly shown in FIG. 2, the reused catalyst 100 includes a hierarchical gradient structure with three layers: a top cover layer 112, an interlayer 114, and a metallic glass matrix 102. In the illustrated embodiment, the surface layer 110 includes a porous sponge layer 112 ($\approx$500 nm) and the interlayer 114 includes a dense amorphous thin interlayer ($\approx$4 nm).

As described herein, the catalyst 100 may be used to perform a catalytic reaction with a reaction for treating wastewater pollutants. The reactant may include a treatment reagent and a target substance to be treated by the treatment reagent, where the target substance may be treated by the treatment reagent upon the metallic glass matrix 102 activates the treatment reagent. Preferably, the treatment reagent includes a persulfate and/or a peroxymonosulfate, and the target substance includes wastewater pollutants such as textile, printing, pharmaceutical or organic wastewater pollutants. For example, persulfate may be sodium/potassium/ammonium persulfate, and peroxymonosulfate may be sodium/potassium/ammonium peroxymonosulfate.

The process of treating the target substance by the activated treatment reagent occurs at the surface layer 110. In one embodiment, the porous structure 116 in the top cover layer 112 is arranged to facilitate reactants to pass therethrough. The interlayer 114 includes, other than the dense amorphous structure, a plurality of adsorption sites 118 arranged to facilitate the catalytic reaction to occur at, where the plurality of adsorption sites 118 includes a plurality of Fe sites each containing a first or a second neighbour of P atom, as discussed later.

The surface layer 110 provides matrix protection together with high permeability and more active sites. In particular, the self-supported porous sponge layer 112 with large surface area provides a stable reaction environment for charge transfer, PS adsorption, and activation for dye molecule degradation, due to the intrinsic chemical heterogeneity of the catalyst 100. The PS molecules rapidly go through the porous channels in the top sponge layer 112 to arrive at the amorphous interlayer 114 to be activated as .OH and $SO_4^-$ radicals, which is beneficial for an effective degradation of the preadsorbed organic molecules. In addition, the self-reconstructed porous sponge structure 112 is able to avoid long-distance transmission of the radicals due to their short lifetime, i.e., a few nanoseconds.

Notwithstanding, the densely packed, thin amorphous interlayer 114 with superiorities of stable, excellent catalytic activity as well as high permeability to the electrons and reactants, provides promoted catalytic performance in both efficiency and sustainability.

The amorphous matrix 102 with fully enriched $Fe^0$ plays the role of an electron "trigger" during the catalytic process. The metallic glass matrix 102 activates the treatment reagent by transforming the treatment reagent to radicals of the treatment reagent. The self-activated electrons from the matrix 102 pass through the permeable amorphous interlayer 114 easily without any obstructions (i.e., grain boundaries), providing a significant enhancement of the PS activation.

Figure 3:
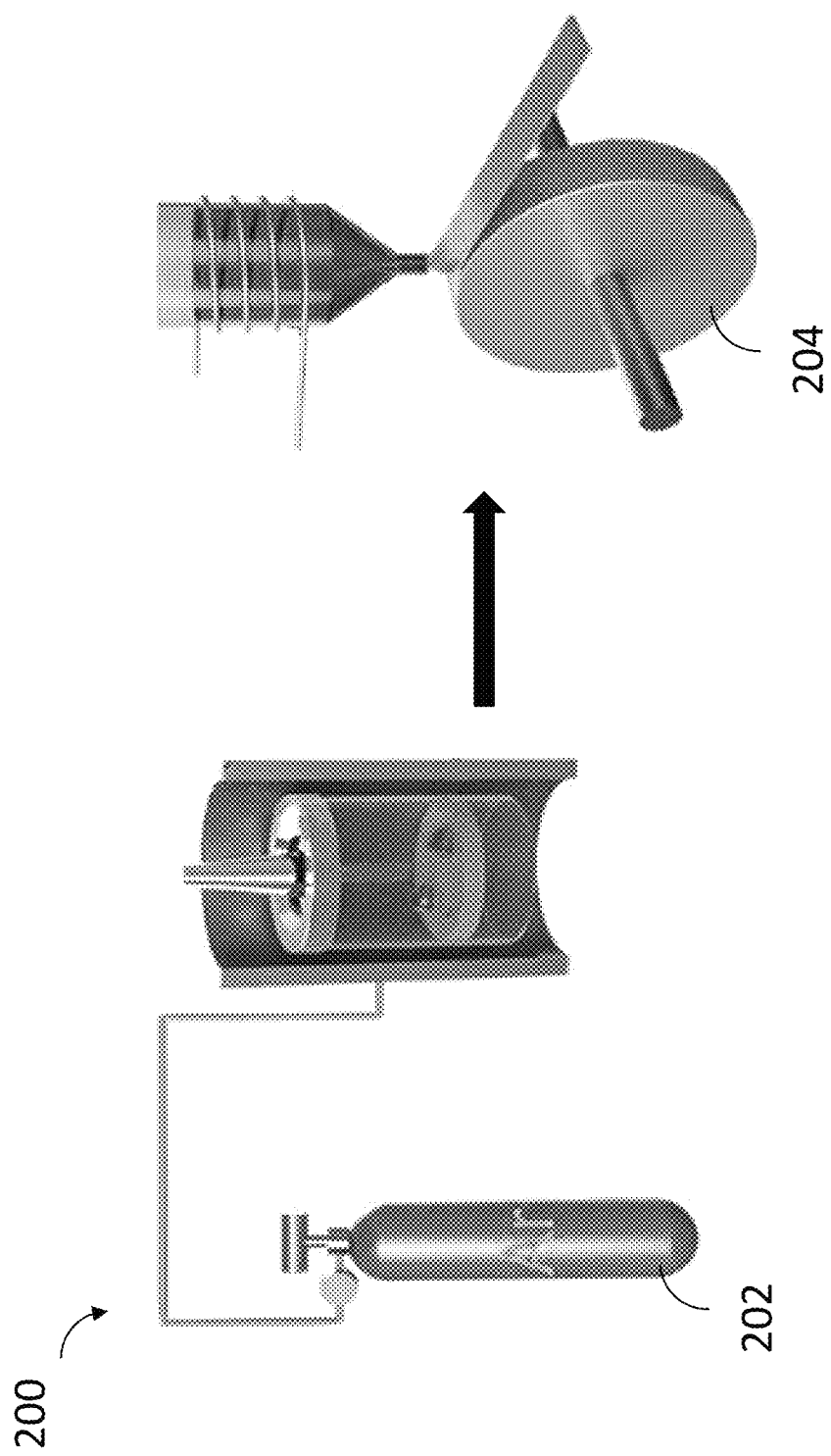
FIG. 3 is a flow diagram showing a method of fabricating the catalyst of FIG. 1A in accordance with one embodiment of the present invention.

FIG. 3 shows a method 200 for fabricating the catalyst 100 shown in FIG. 1A having a substantially flat shape, comprising the step of: melting a master alloy with a designed atomic composition comprising iron (Fe) and phosphorous (P); and melt-spinning the melted alloy to form an amorphous structure of the metallic glass matrix in a ribbon state. In the illustrated embodiment, the alloy is melted using an arc-melting method 202 in an electric arc melting furnace. The master alloy may further include at least one of silicon (Si), boron (B) and carbon (C). For example, the atomic composition may be in the range of Fe (60-85%), Si (0-20%), B(0-20%), P(1-20%), C(0-10%).

In one example and preferred embodiment, the designed atomic composition of the master alloy is $Fe_{83}Si_2B_{11}P_3C_1$. The master alloy includes high-purity metals (99.9%) and is melted under a Ti-gettered Ar atmosphere by the arc-melting method 202. The melted master alloy ingots (10-30 g) are then treated using the melt-spinning method 204. The melted alloys are put into a quartz crucible under a high-purity Ar atmosphere to be further melted under a temperature of 1200° C. to 1500° C., following by being ejected onto a rotated copper roll surface with a high speed of 23 $ms^{-1}$ to 45 $ms^{-1}$ for rapid quenching at room temperature. The as-quenched glassy ribbons are in a thickness of 20-50 μm. Alternatively, the melted alloy may be applied or deposited on other "substrates" to form a film of such catalyst having a substantially flat shape, or may be manufactured as other shapes or forms such as powders or small particles.

Following descriptions will be made using the above-mentioned embodiment with an atomic composition of $Fe_{83}Si_2B_{11}P_3C_1$. FIGS. 4 to 7 show the characterisation of the freshly prepared $Fe_{83}Si_2B_{11}P_3C_1$ catalyst 100' fabricated using the method of FIG. 3.

Figure 4:
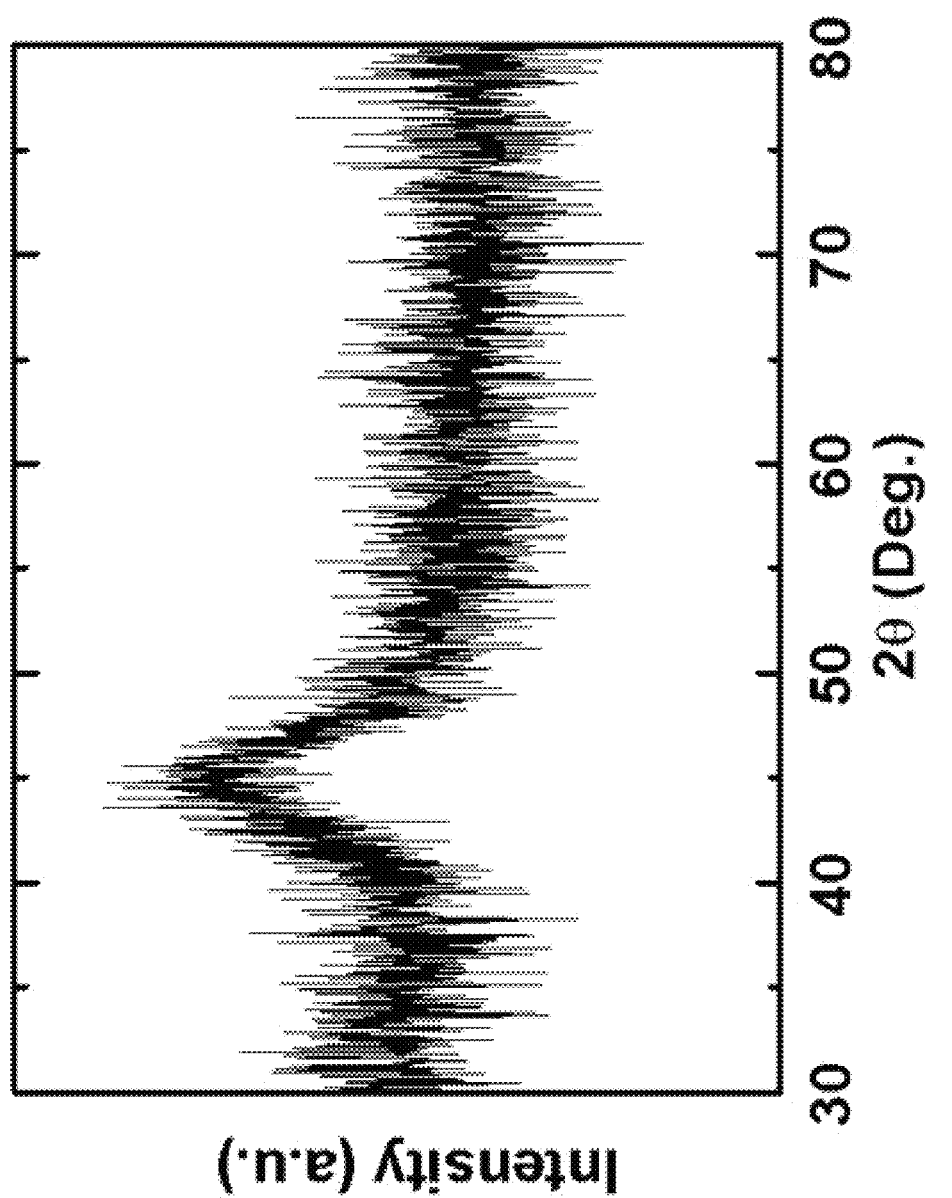
FIG. 4 is an XRD measurement of a catalyst fabricated using the method of FIG. 3, having a composition of $Fe_{83}Si_2B_{11}P_3C_1$.

FIG. 4 shows an X-ray diffraction (XRD) pattern of the $Fe_{83}Si_2B_{11}P_3C_1$ metallic glass collected using an X-ray diffractometer (Rigaku SmartLab) using Cu Kα radiation. It is observed that the metallic glass exhibits a broad diffuse diffraction peak, indicating that the structure of the metallic glass is fully in an amorphous state.

Figure 5:
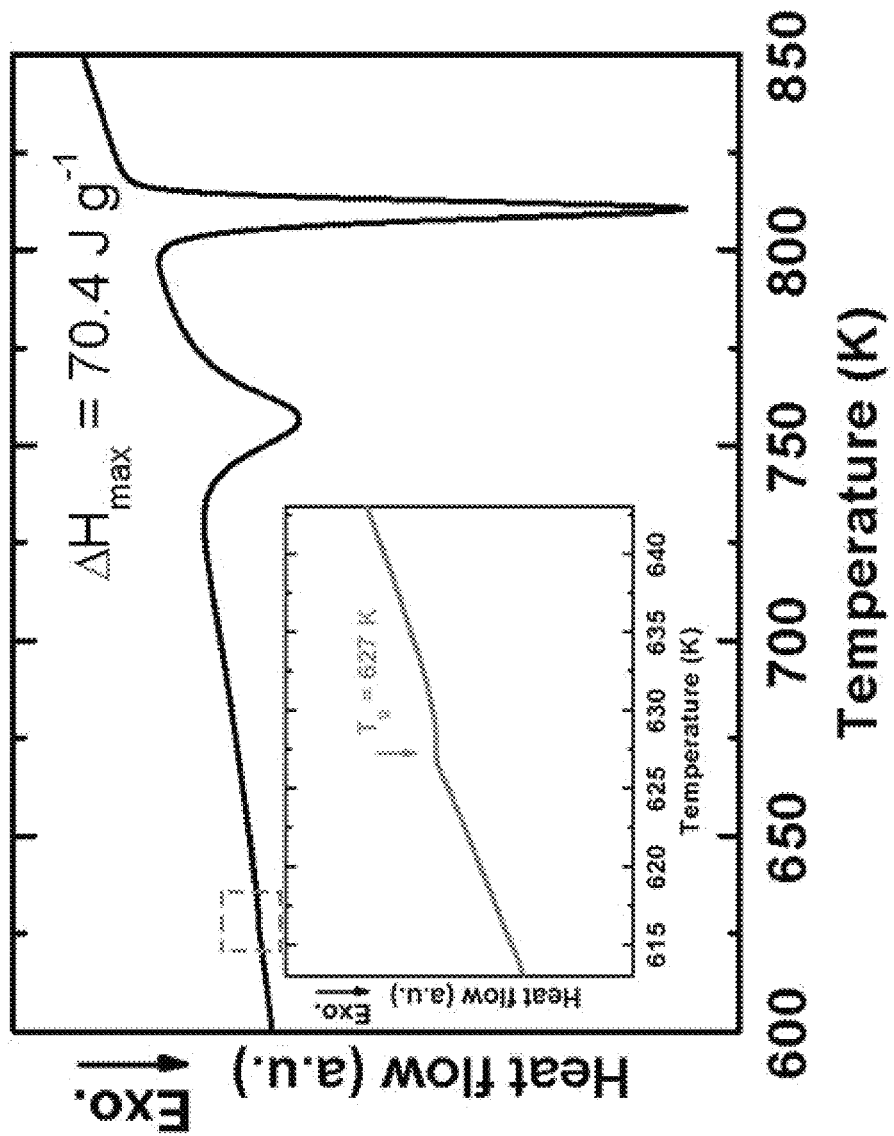
FIG. 5 is a DSC measurement of the $Fe_{83}Si_2B_{11}P_3C_1$ catalyst of FIG. 4.

FIG. 5 shows a differential scanning calorimetry (DSC) pattern of the $Fe_{83}Si_2B_{11}P_3C_1$ metallic glass. It is found that the $Fe_{83}Si_2B_{11}P_3C_1$ metallic glass presents distinct features as a glassy state including glass transition ($T_g$) with an endothermic peak at ~627 K (inset of FIG. 5) and two crystallization processes with exothermic peaks at ~758 and 808 K, respectively. The transformation enthalpy ($\Delta H_{max}$) of the $Fe_{83}Si_2B_{11}P_3C_1$ metallic glass is calculated as 70.4 J $g^{-1}$ based on the integral area of the two exothermic peaks.

Figure 6:
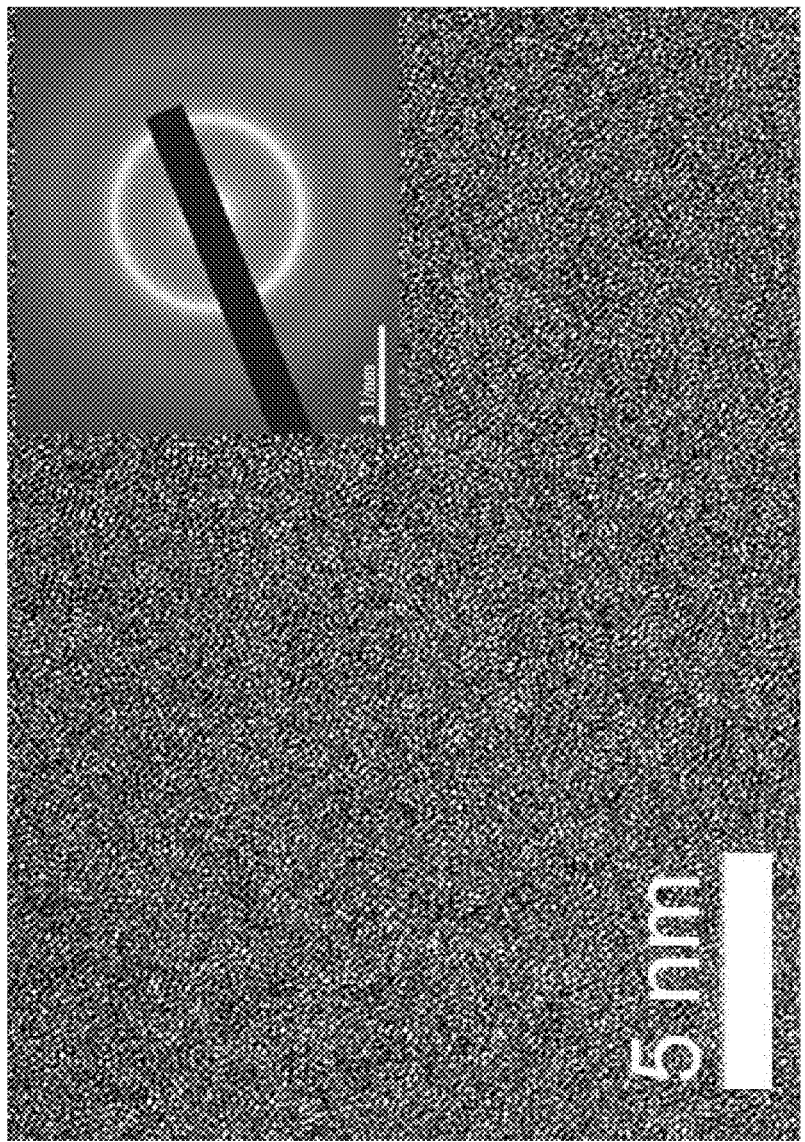
FIG. 6 is a HRTEM image of the $Fe_{83}Si_2B_{11}P_3C_1$ catalyst of FIG. 4 with an SAED pattern inset.

FIG. 6 shows High Resolution Transmission Electron Microscope (HRTEM) and Selected Area Electron Diffraction (SAED) images to further confirm the amorphous nature of the $Fe_{83}Si_2B_{11}P_3C_1$ metallic glass. It can be seen that the $Fe_{83}Si_2B_{11}P_3C_1$ metallic glass is mainly in amorphous state only with short-range ordered atomic clusters.

Figure 7:
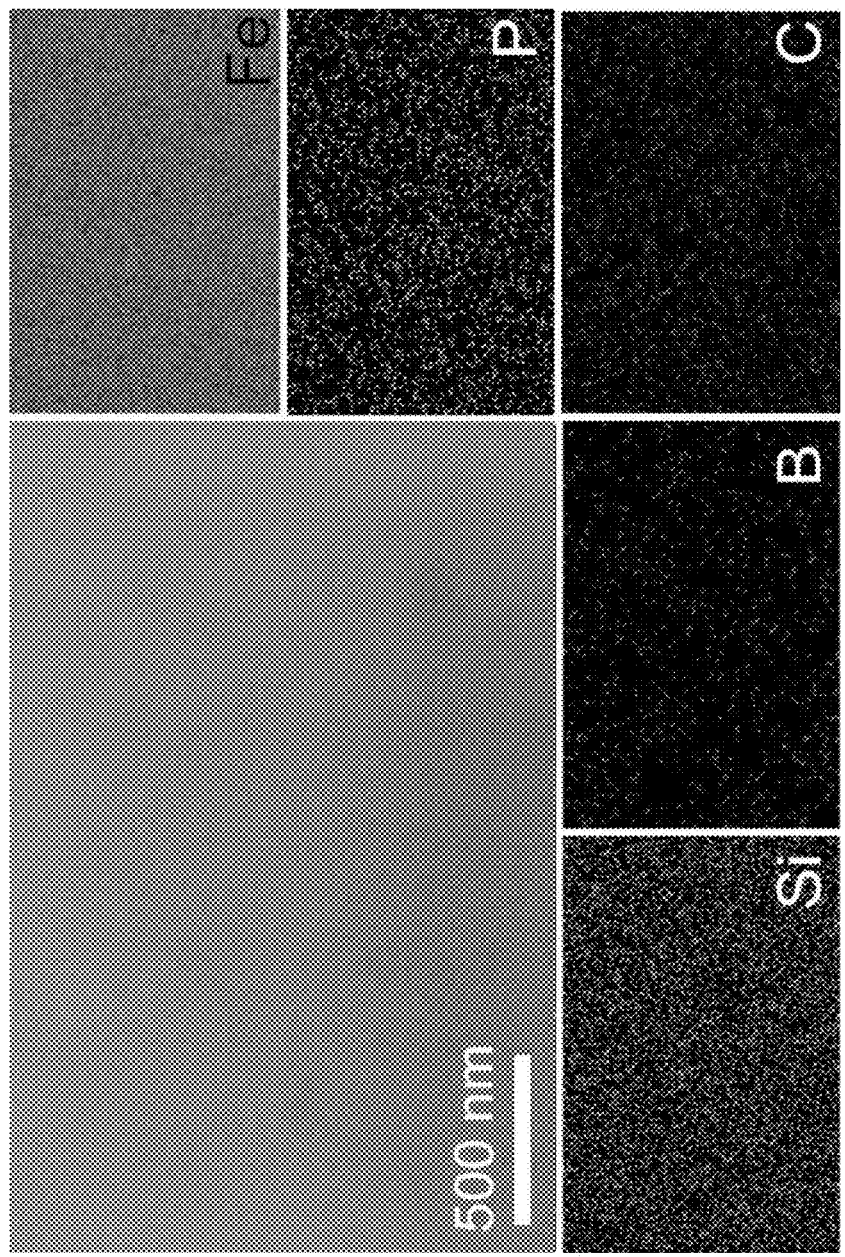
FIG. 7 is an SEM image of the $Fe_{83}Si_2B_{11}P_3C_1$ catalyst of FIG. 4 with corresponding EDS mapping images showing elemental mapping results.

FIG. 7 shows scanning electron microscope (SEM) and elemental mapping images of the $Fe_{83}Si_2B_{11}P_3C_1$ metallic glass. It is observed that the free surface of the $Fe_{83}Si_2B_{11}P_3C_1$ metallic glass is ultra-smooth without any porous or roughness even in the high-resolution SEM image. The elements of iron, silicon, boron, phosphorus, and carbon are homogeneously distributed on the surface of the $Fe_{83}Si_2B_{11}P_3C_1$ metallic glass.

Figure 8:
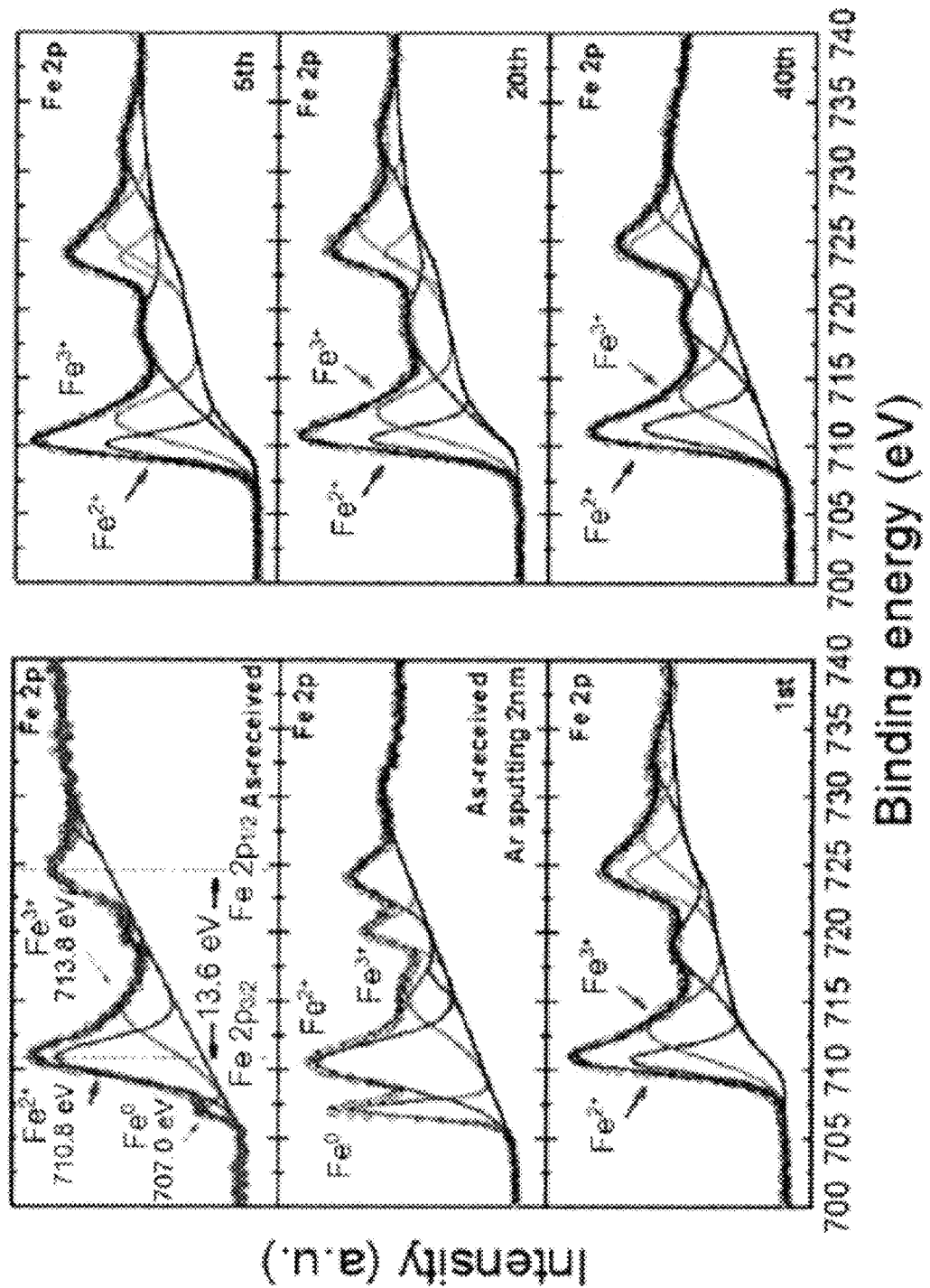
FIG. 8 shows XPS results of Fe 2p spectra of the $Fe_{83}Si_2B_{11}P_3C_1$ catalyst of FIG. 4 and the same $Fe_{83}Si_2B_{11}P_3C_1$ catalyst after being reused.

FIGS. 8 to 12 show the characterisation of the reused $Fe_{83}Si_2B_{11}P_3C_1$ catalyst 100. As shown in FIG. 8, the metallic Fe ($Fe^0$) with a peak location at 707.0 eV is characterized for the as-received ribbons. After $Ar^+$ sputtering for a 2 nm thickness, the concentration of $Fe^0$ increases sharply, indicating that the Fe atoms are in zero-valence state in the as-received glassy ribbon matrix. The peaks at 710.8 and 713.8 eV demonstrate the existence of $Fe^{2+}$ and $Fe^{3+}$, respectively, suggesting the formation of covalent bonding between Fe and other metalloids. However, metallic $Fe^0$ is completely transformed to $Fe^{2+}$ and $Fe^{3+}$ in the reused glassy ribbons, even those that are $Ar^+$ sputtered, demonstrating that the amorphous matrix with $Fe^0$ is the electron supplier during the catalytic performance, while further affirming the formation of Fe oxides and FeOOH.

As discussed above, the surface layer 110 includes a material property different from that of the metallic glass matrix 102 being covered by the surface layer 110. In one embodiment, the material property includes a material composition. The material composition gradually changes from the portion of the metallic glass matrix 102 to a portion of the surface layer 110, particularly from the metallic glass matrix 102 to the top cover layer 112.

Figure 9:
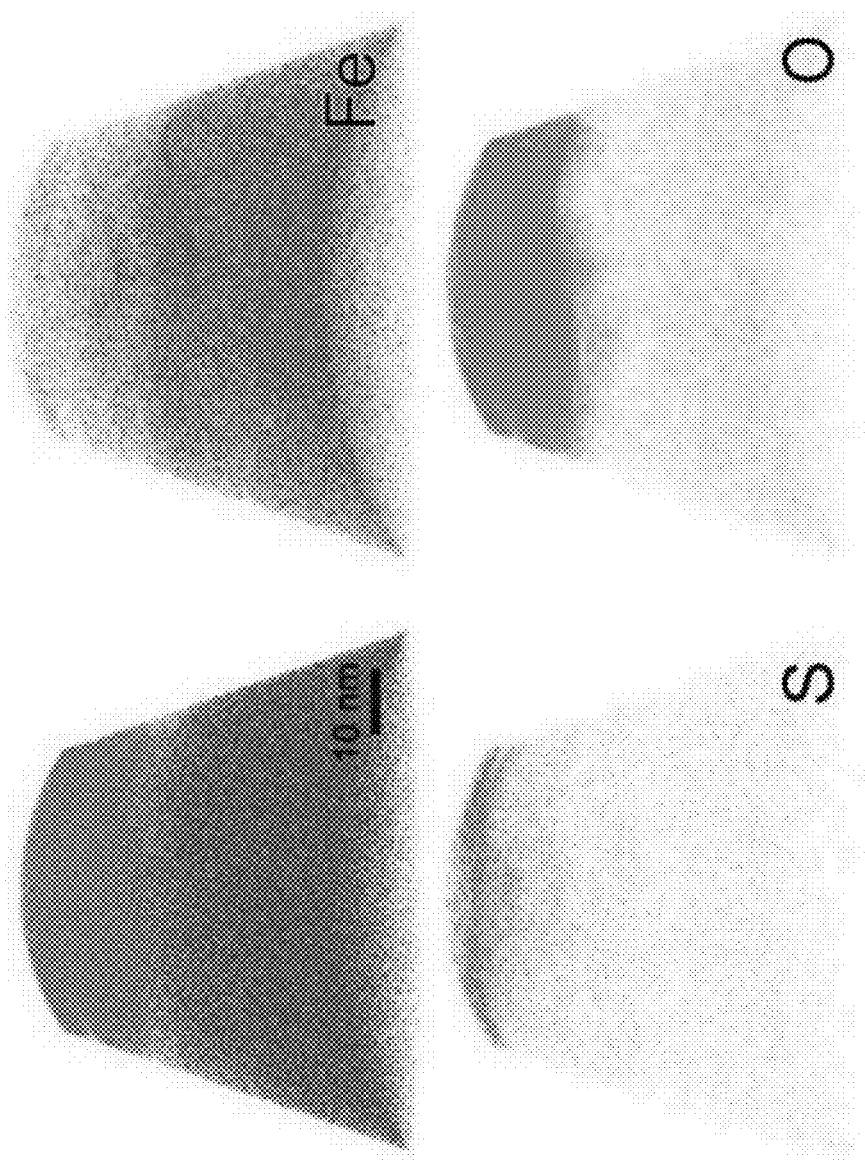
FIG. 9 shows 3D APT images of the reused $Fe_{83}Si_2B_{11}P_3C_1$ catalyst of FIG. 8.

FIG. 9 displays 3D atom probe tomography (APT) images of the reused catalyst 100. It is noteworthy that the reused catalyst 100 presents a distinct hierarchical gradient structure with the surface layer 110 having iron content lower than that in the metallic glass matrix 102, and sulfate and oxide content higher than that in the metallic glass matrix 102. The reused catalyst 100 presents a gradation of Fe composition along the thickness direction, i.e., the metallic glass matrix 102 with the highest Fe concentration (≈80 at %) followed by a dense amorphous layer 114 with ≈50 at % Fe and a porous sponge layer 112 with ≈20 at % Fe.

Figure 10:
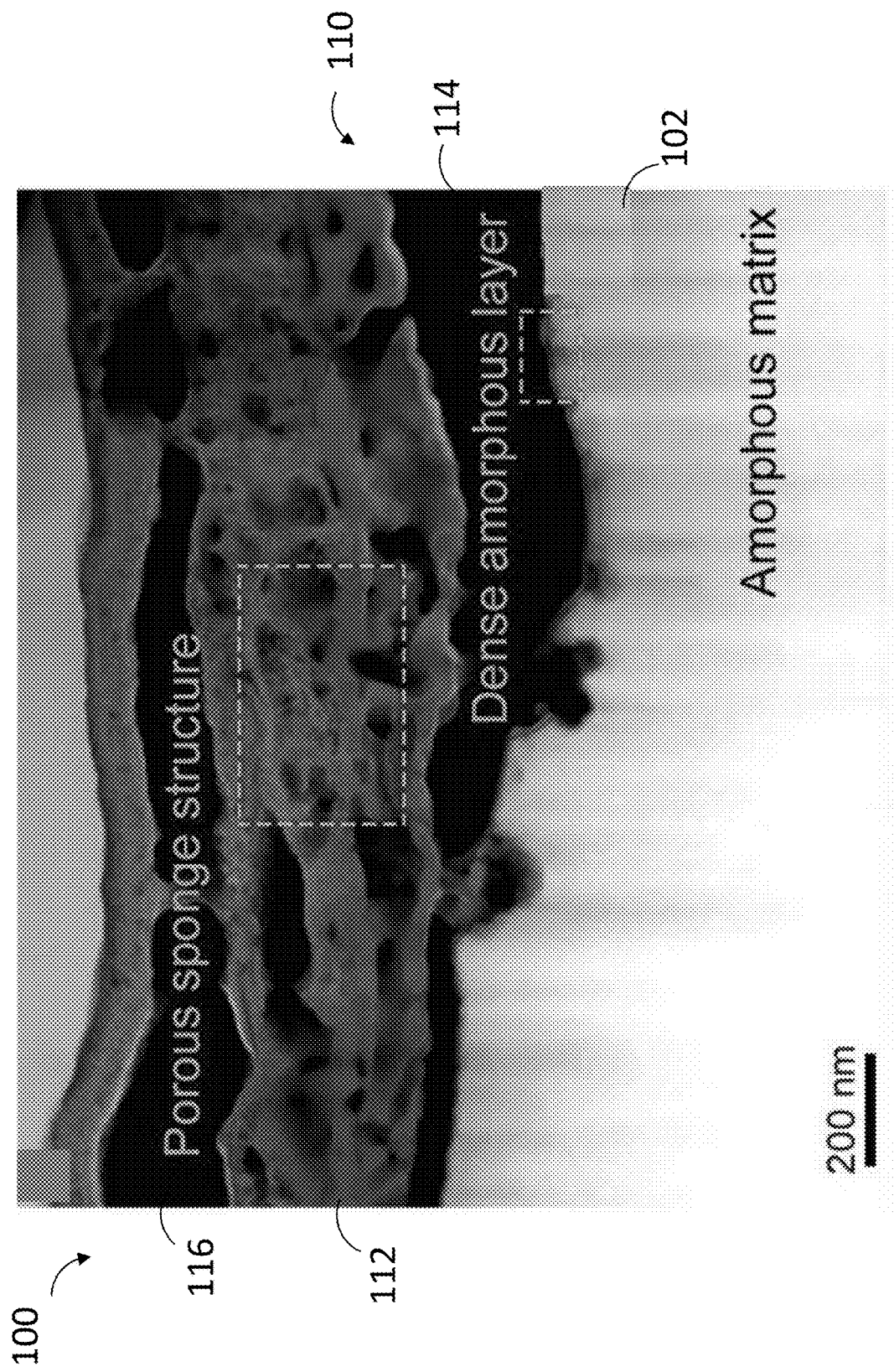
FIG. 10 is a STEM-HAADF image showing a cross-sectional structure of the reused $Fe_{83}Si_2B_{11}P_3C_1$ catalyst of FIG. 8, showing the top cover layer, the interlayer and the metallic glass matrix.

As mentioned above, the surface layer 110 of the catalyst 100 is gradually self-reconstructed during catalytic process. FIG. 10 shows a spherical aberration-corrected high-angle annular dark-field scanning TEM (HAADF-STEM) image of the cross-sectional structure of the reused catalyst 100. Compared with the smooth surface of the as-received ribbons 100', many particle-like sediments are homogeneously distributed on the first-time reused ribbons 100 followed by extensive expansion to wrinkled-like layers 110 on the multiple-time reused ribbons 100. The wrinkled layers 110 comprise Fe oxides.

Further increasing the reuse times, the wrinkled layers 110 are partially dropped-off to expose the underlaid fresh layer. The surface roughness ($R_q$) obtained from atomic force microscopy (AFM) measurements of the first, fifth, and twentieth times reused ribbons are 17.3, 93.4, and 146 nm, respectively.

Figure 11B:
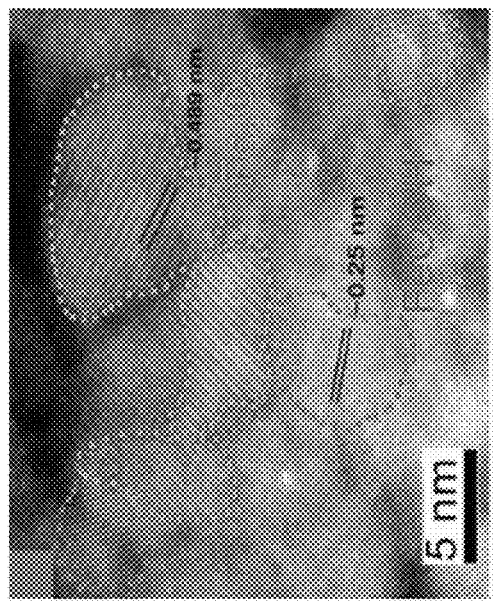
FIG. 11B is an enlarged STEM-HAADF image of FIG. 11A, showing the top cover layer.
Figure 11A:
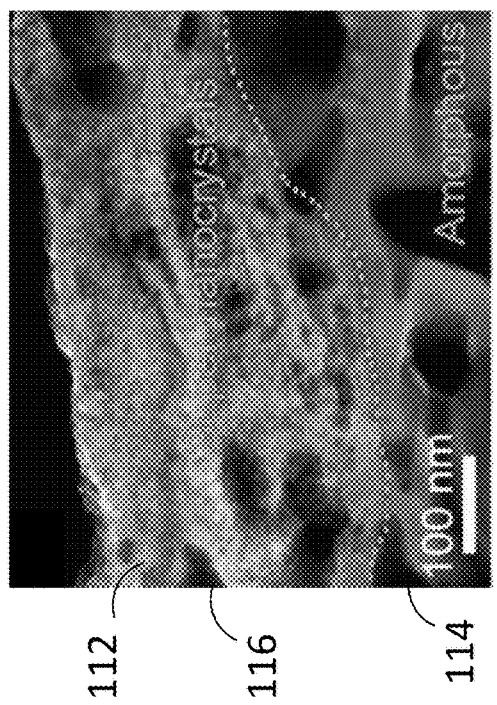
FIG. 11A is an enlarged STEM-HAADF image of FIG. 10, showing the top cover layer and the interlayer.
Figure 11C:
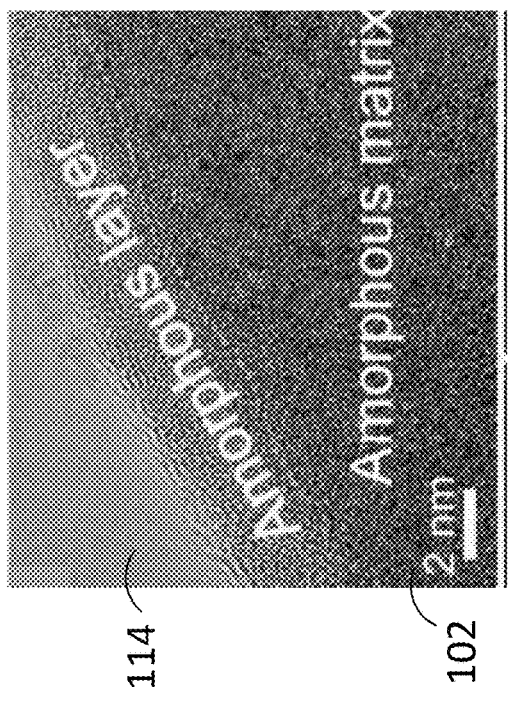
FIG. 11C is an HRTEM image showing the interlayer and the metallic glass matrix of FIG. 10.

The reused $Fe_{83}Si_2B_{11}P_3C_1$ glassy ribbons 100 are still mainly in an amorphous state even when reused up to 40 times. As more clearly shown in FIGS. 11A and 11B, the top cover layer 112 includes a porous sponge structure 116 including a nanocrystalline phase (nanocrystals≤10 nm, $Fe_2O_3$ and FeOOH) encapsulated in an amorphous phase, whereas the interlayer 114 includes a dense amorphous structure with an atomic density higher than that of the metal glass matrix 102. FIG. 11C shows a combination of high resolution TEM and selected area electron diffraction images, showing an approximate nm amorphous layer 114 with an atomic-scale short-range ordering in the amorphous matrix 102.

FIGS. 12A to 12D show the corresponding elemental distributions of the reused catalyst 100. Obviously, elemental Fe, Si, B, P, and C are homogeneously distributed in the amorphous matrix 102 and elemental O and S (S is from PS, $S_2O_8^{2-}$) are concentrated on the porous sponge layer 112, demonstrating that the PS activation mainly occurs in the porous sponge region 112 and the amorphous matrix 102 is in perfect condition without being involved in the chemical reaction. It is also found that P is more concentrated in the amorphous metallic glass matrix 102, providing enhanced charge transfer due to the atomic coordination of the Fe—P bond.

In an experiment performed by the inventors, the wastewater treatment performance using a $Fe_{83}Si_2B_{11}P_3C_1$ catalyst prepared using the method of FIG. 3 was carried out for the degradation of various water pollutants, such as rhodamine B, methylene blue, methylene orange and mixed solution. Each experiment involved a dye concentration of 20 ppm, catalyst dosage of 45 mg, and PS concentration of 2 mM. The target dye solution assessments were conducted in a thermostatic water bath to adjust the constant temperature (i.e., 294.5, 303.0, 313.0, 323.0, and 333.0 K). The aqueous dye solutions (4 mL) were taken out at various time intervals of 0, 2, 5, 10, 15, 20, and 30 min followed by determination of UV-Vis spectra for dye decolorization and of TOC measurements for dye mineralization. Each dye degradation experiment was conducted three times to improve experimental accuracy. The absorbance peaks ($\lambda_{max}$) of the four dyes were located at 554 nm (rhodamine B), 664 nm (methylene blue), 505 nm (methylene orange), and 554 nm (mixed solution), respectively. For reuse experiments, each reused catalyst was washed with Milli-Q water three times followed by preservation in absolute ethanol solution.

Figure 13B:
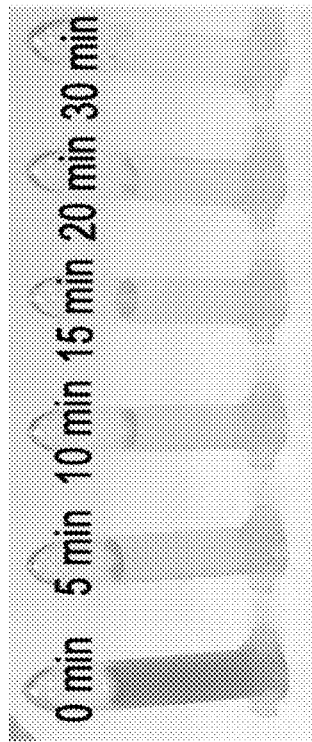
FIG. 13B shows visible color changes of methylene blue using the $Fe_{83}Si_2B_{11}P_3C_1$ catalyst of FIG. 4 over time.
Figure 13D:
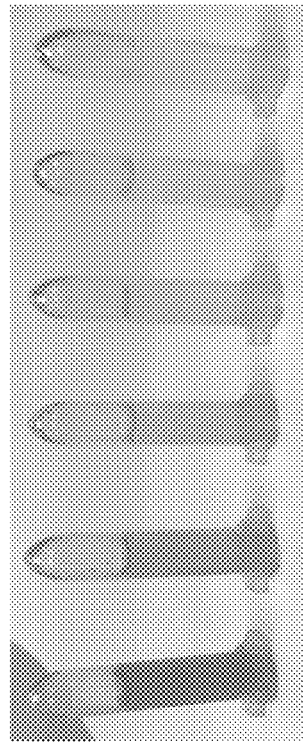
FIG. 13D shows visible color changes of mixed solution using the $Fe_{83}Si_2B_{11}P_3C_1$ catalyst of FIG. 4 to activate persulfate over time.
Figure 13A:
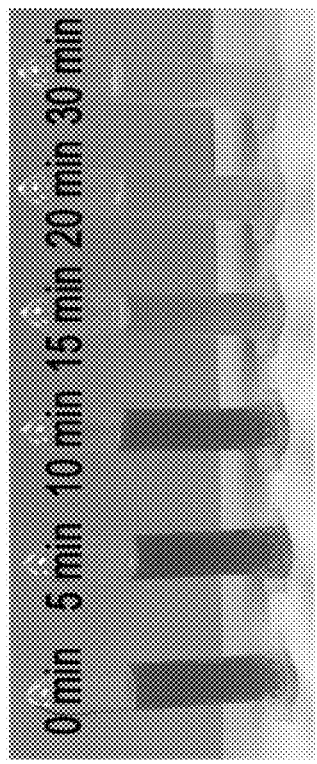
FIG. 13A shows visible color changes of rhodamine B using the $Fe_{83}Si_2B_{11}P_3C_1$ catalyst of FIG. 4 over time.
Figure 13C:
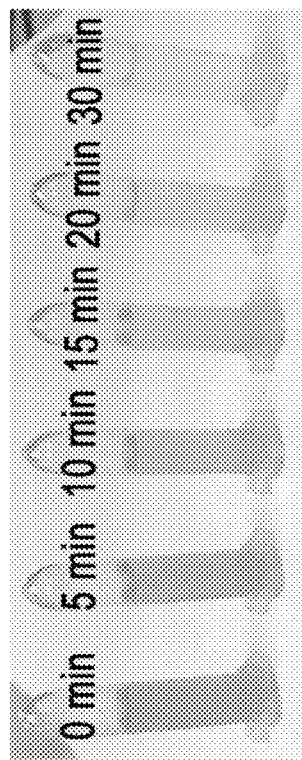
FIG. 13C shows visible color changes of methylene orange using the $Fe_{83}Si_2B_{11}P_3C_1$ catalyst of FIG. 4 over time.

In one example embodiment of the present invention, as shown in FIGS. 13A to 13D, 45 mg of the as-received $Fe_{83}Si_2B_{11}P_3C_1$ metallic glass catalysts was used to activate 2 mM of persulfate for the degradation of various organic dye pollutants, such as rhodamine B (FIG. 13A), methylene blue (FIG. 13B), methylene orange (FIG. 13C) and mixed aqueous solution with complex organic structures (FIG. 13D). It is shown that all the colorants were progressively decolorized to colorless within 30 min without any additional conditions.

Figure 14A:
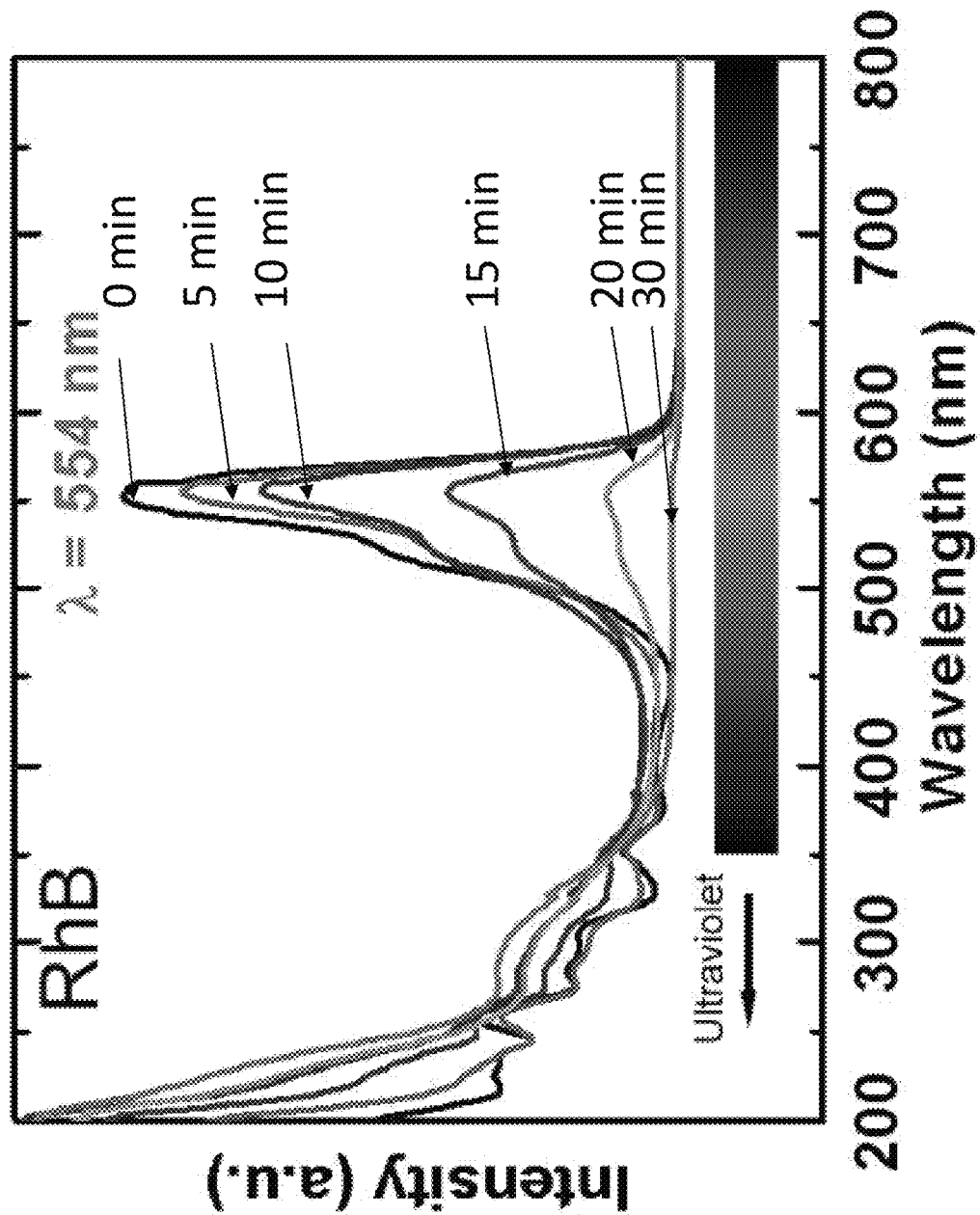
FIG. 14A shows UV-vis spectra of rhodamine B using the $Fe_{83}Si_2B_{11}P_3C_1$ catalyst of FIG. 4 to activate persulfate at different time intervals.
Figure 14B:
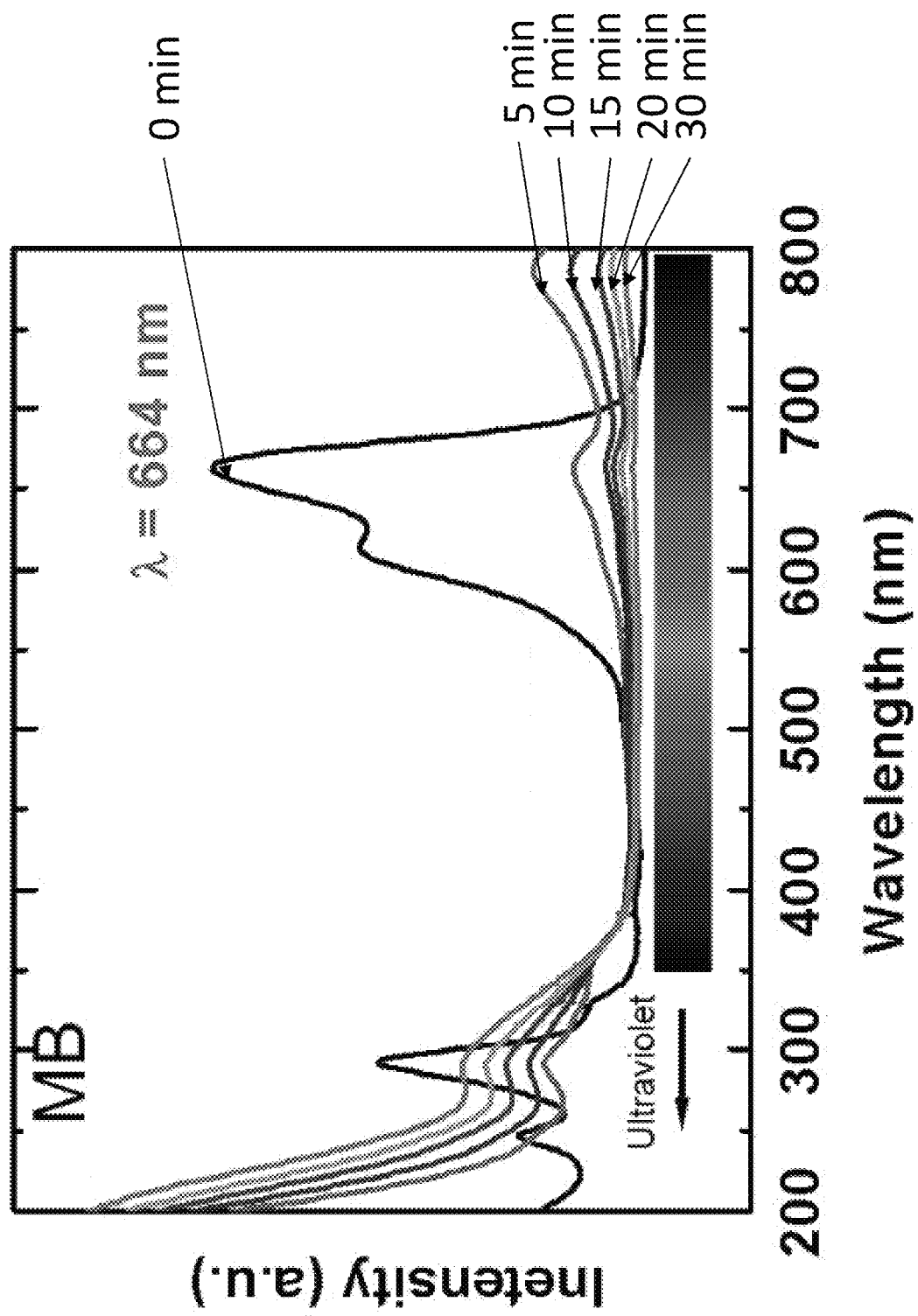
FIG. 14B shows UV-vis spectra of methylene blue using the $Fe_{83}Si_2B_{11}P_3C_1$ catalyst of FIG. 4 to activate persulfate at different time intervals.
Figure 14C:
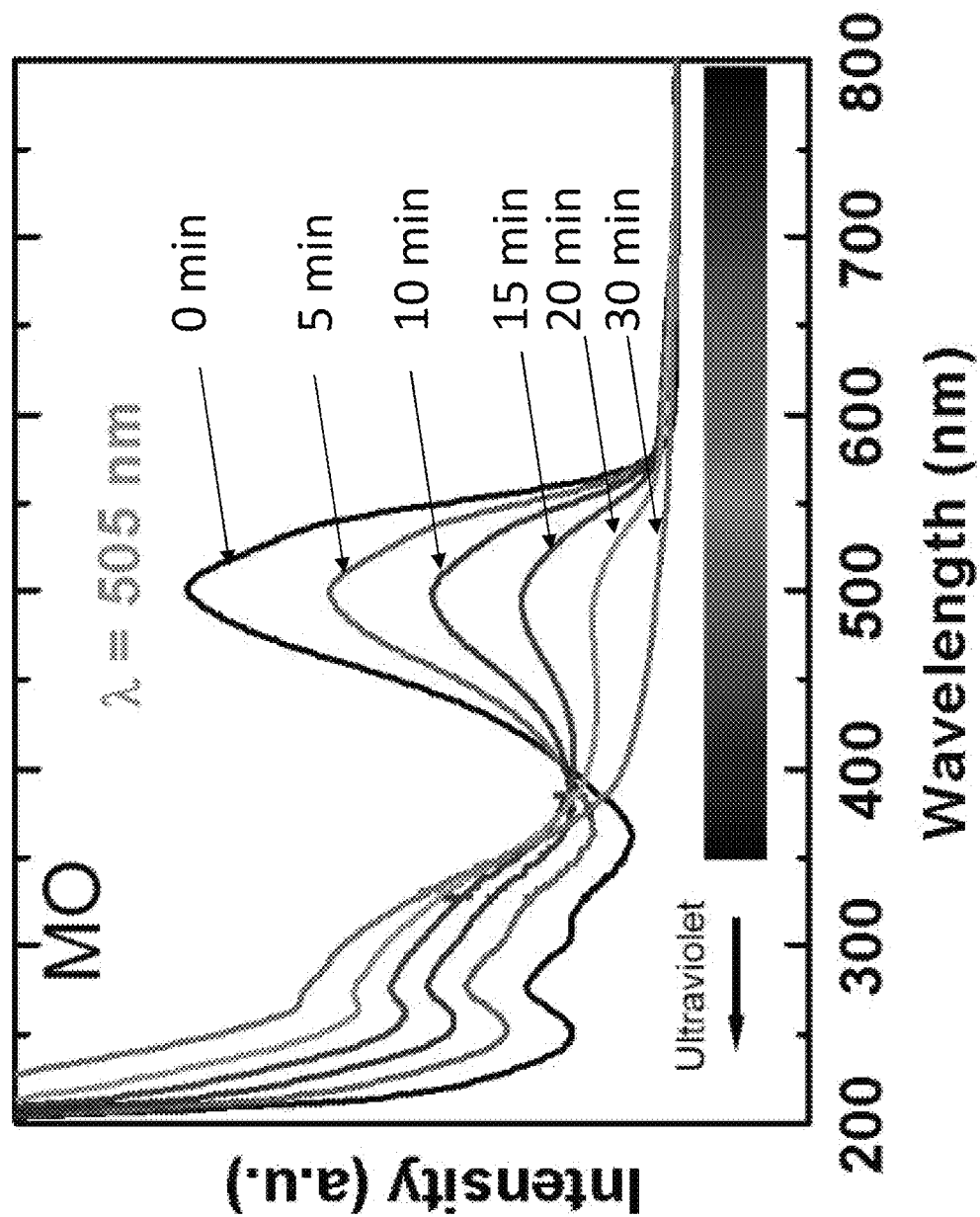
FIG. 14C shows UV-vis spectra of methylene orange using the $Fe_{83}Si_2B_{11}P_3C_1$ catalyst of FIG. 4 to activate persulfate at different time intervals.
Figure 14D:
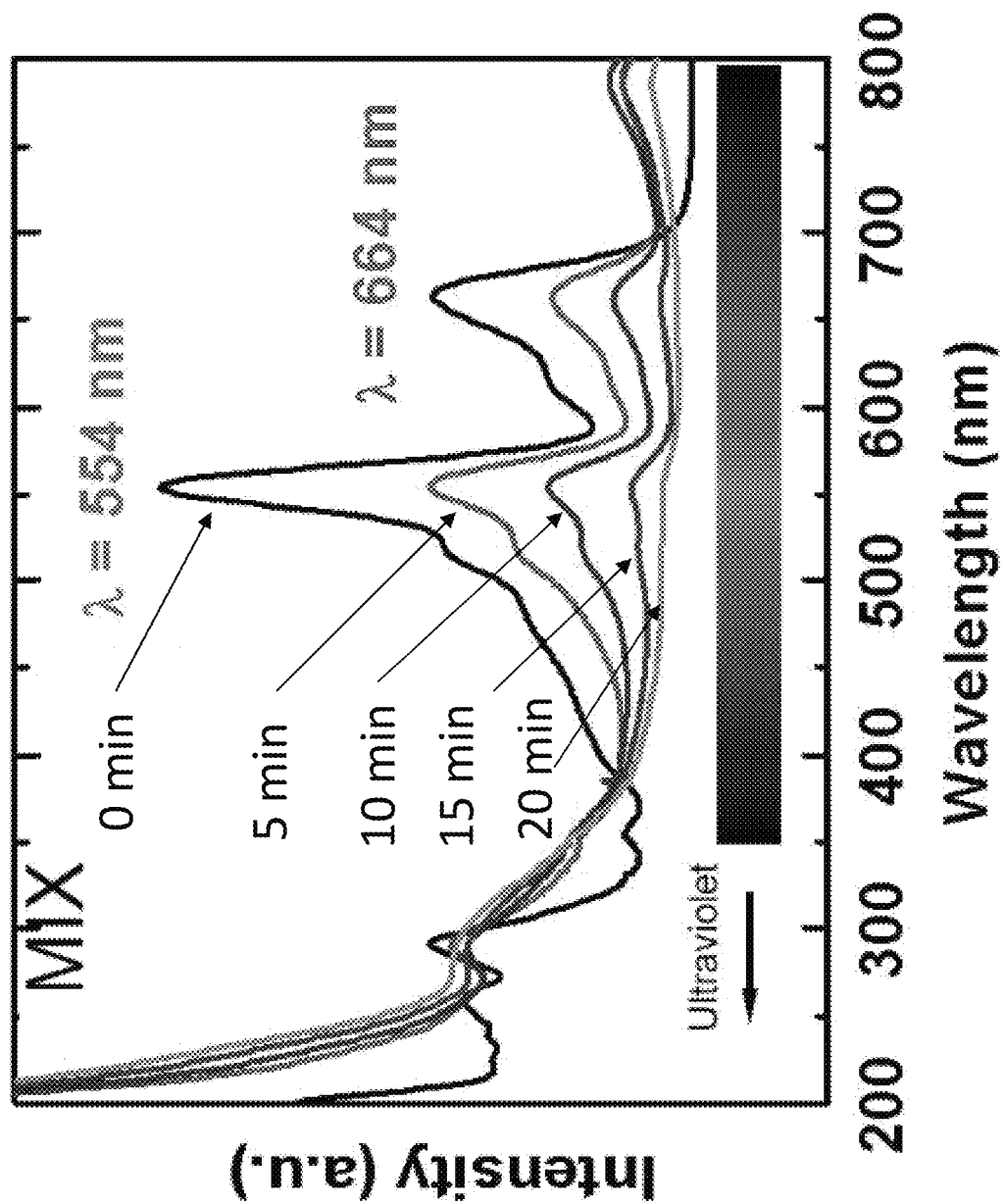
FIG. 14D shows UV-vis spectra of mixed solution using the $Fe_{83}Si_2B_{11}P_3C_1$ catalyst of FIG. 4 to activate persulfate at different time intervals.

FIG. 14A to 14D present the corresponding ultraviolet visible-light (UV-Vis) spectra of the four colorants' decolorization (FIG. 14A: rhodamine B; FIG. 14B: methylene blue; FIG. 14C: methylene orange; FIG. 14D: mixed solution). Specifically, the maximum absorbance peak ($\lambda_{max}$) with respect to the primary chromophore bonds under visible spectrum region in various dyes are gradually invisible, indicating the big organic molecules in the colorants are firstly degraded to small molecules, through being rapidly destroyed and mineralized by the generated hydroxyl radicals (.OH) and sulfate radicals (SO4.−) to environmentally friendly $H_2O$, $CO_2$, etc., and the color has been faded during the Fenton-like reaction. The peaks at UV region are normally considered as the aromatic structures in the dyes, presenting a progressively flattened and a slightly increased phenomenon. Such results further evidence that the organic structures are cleaved to small organic structures.

Figure 15:
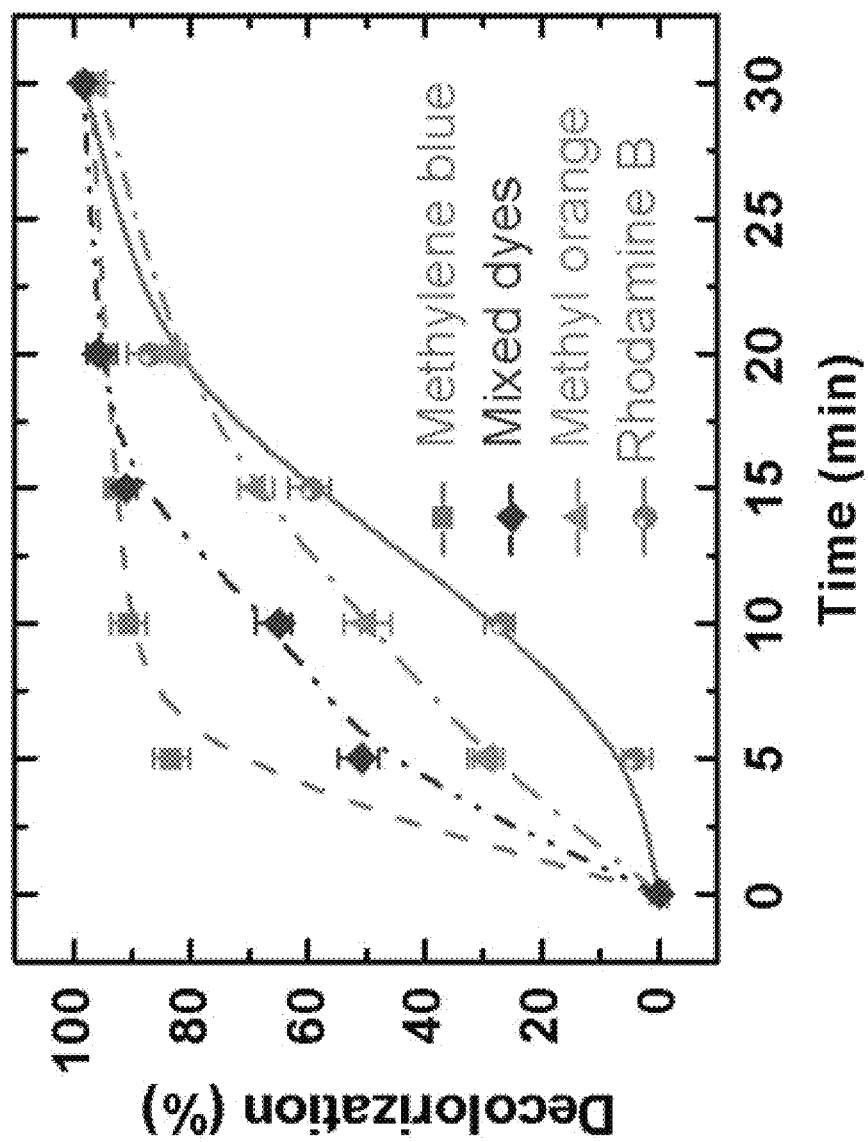
FIG. 15 shows the decolorization efficiencies of rhodamine B, methylene blue, methylene orange, and mixed solution using the $Fe_{83}Si_2B_{11}P_3C_1$ catalyst of FIG. 4 to activate persulfate.
Figure 16:
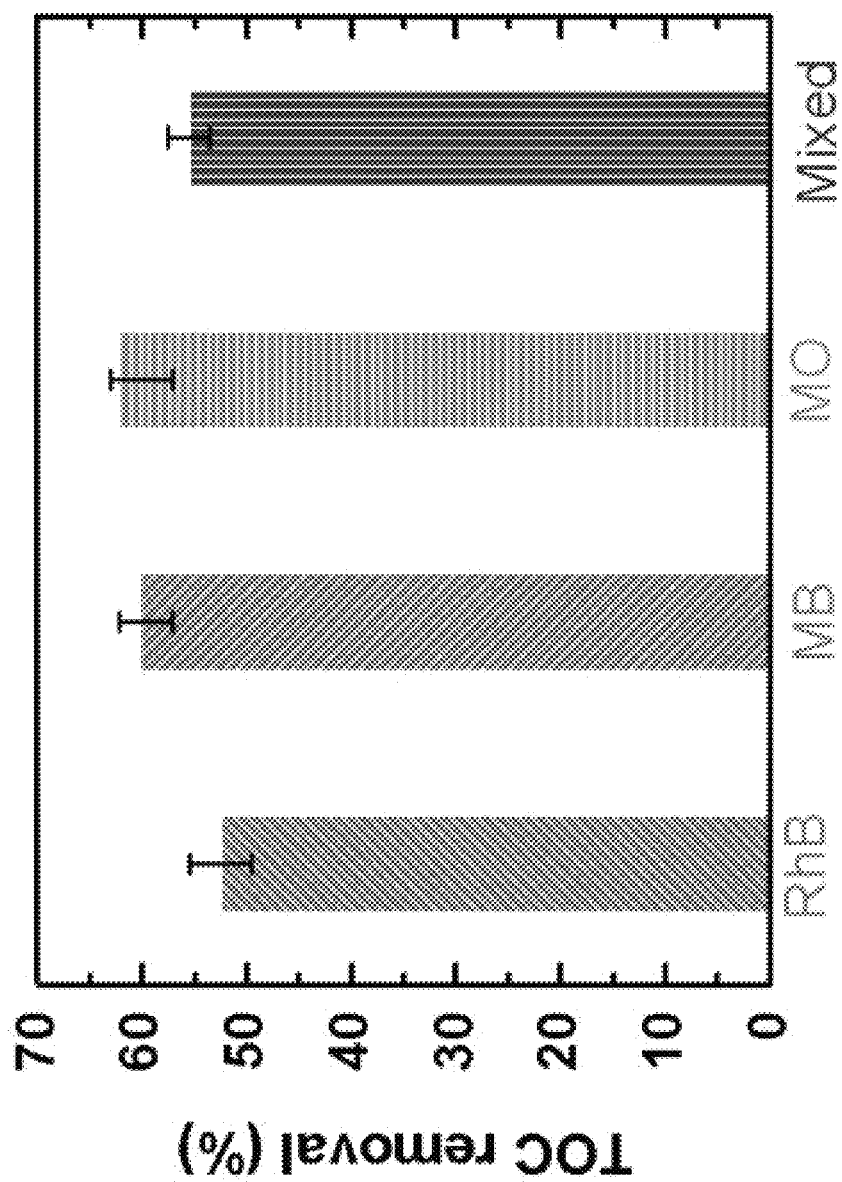
FIG. 16 shows the TOC removals of rhodamine B, methylene blue, methylene orange, and mixed solution using the $Fe_{83}Si_2B_{11}P_3C_1$ catalyst of FIG. 4 to activate persulfate.

FIGS. 15 and 16 demonstrate that nearly 100% of the color and more than 50% of the total organic carbon (TOC), respectively, can be removed within 30 min for all four different organic pollutants (20 ppm) using 45 mg of $Fe_{83}Si_2B_{11}P_3C_1$ metallic glass and 2 mM of persulfate in the Fenton-like system.

Figure 17:
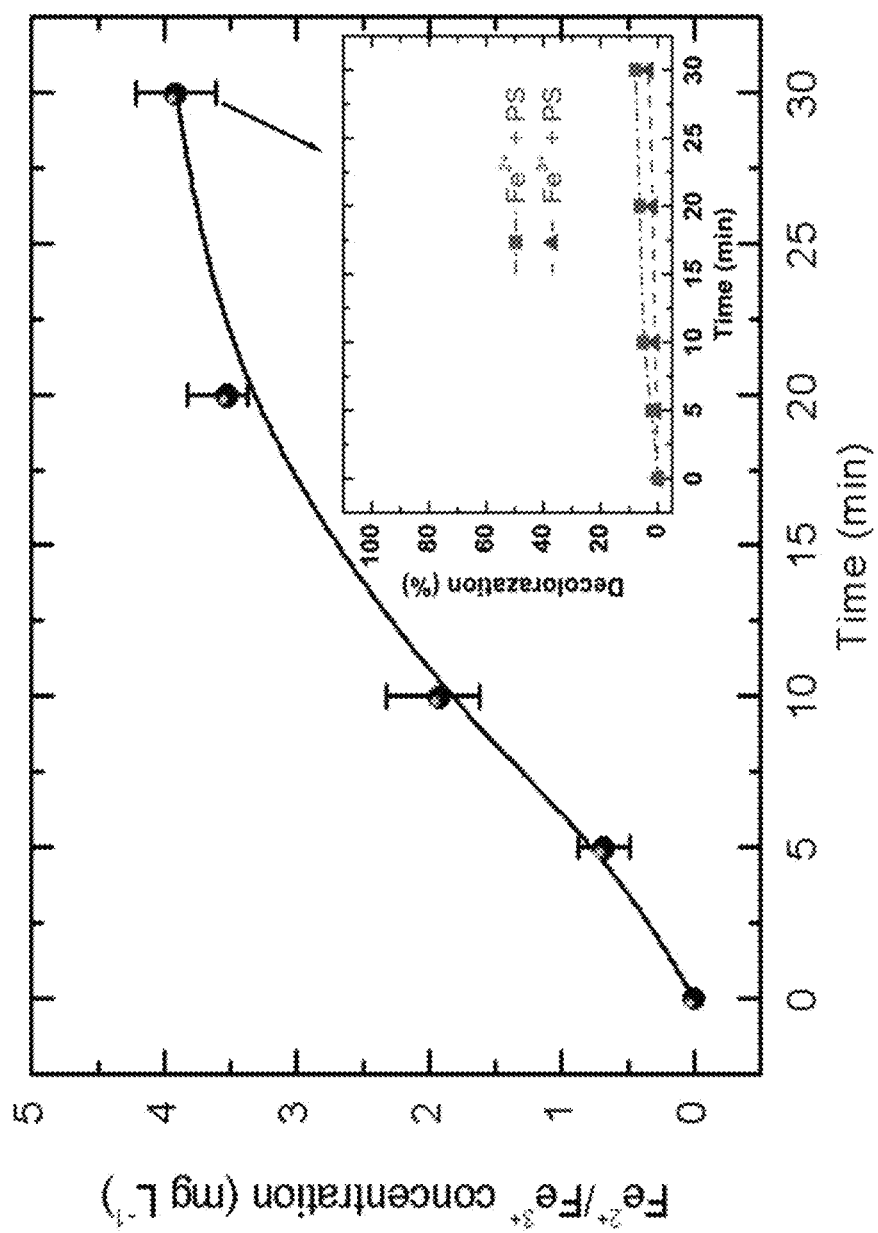
FIG. 17 is a graph showing a Fe leaching concentration during rhodamine B degradation using the $Fe_{83}Si_2B_{11}P_3C_1$ catalyst of FIG. 4 to activate persulfate, with an graph inset showing the effect of the leached Fe ion on decolorization.

Furthermore, as shown in FIG. 17, the iron-leached concentration (3.9 mg $L^{-1}$) using $Fe_{83}Si_2B_{11}P_3C_1$ metallic glass catalysts was much lower than the other Fe-based metallic glasses (>10 mg $L^{-1}$) during the catalytic activity, and the leached iron ion solution only contributed less than 5% of dye degradation, demonstrating that the dye purification in this invention was primarily induced by the $Fe_{83}Si_2B_{11}P_3C_1$ metallic glass and persulfate in heterogeneous reaction. Furthermore, the Fe-leached concentration (3.9 mg $L^{-1}$) using $Fe_{83}Si_2B_{11}P_3C_1$ ribbons was much lower than the other Fe-based MGs (>10 mg $L^{-1}$) during the catalytic activity, and the leached Fe ion solution only contributed less than 5% of dye degradation, demonstrating that the dye purification in the present invention was primarily induced by the $Fe_{83}Si_2B_{11}P_3C_1$ glassy ribbon in heterogeneous reaction.

Figure 18:
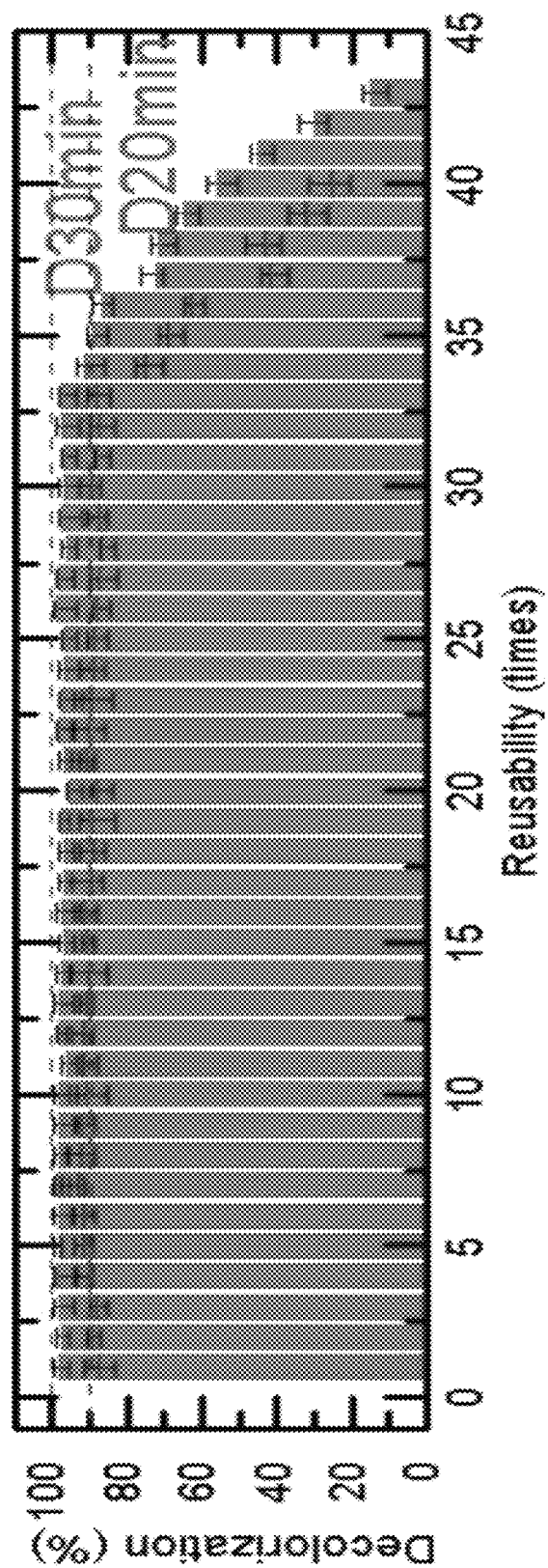
FIG. 18 is a graph showing the stability of the $Fe_{83}Si_2B_{11}P_3C_1$ catalyst of FIG. 4 for the activation of persulfate in rhodamine B degradation.

The inventors have also devised that the $Fe_{83}Si_2B_{11}P_3C_1$ metallic glass presents a remarkable stability in this invented Fenton-like method. FIG. 18 shows the reusability of the as-received $Fe_{83}Si_2B_{11}P_3C_1$ glassy ribbons for rhodamine B degradation. Surprisingly, the $Fe_{83}Si_2B_{11}P_3C_1$ metallic glass can be reused up to ~35 times while maintaining nearly identical efficiency with the first use, following by a "tenacious" decay until reaching final shattering at ~45 reuses. The rhodamine B degradation efficiency could be sustained at nearly 80% within 20 min and at 100% within 30 min only by the addition of 2 mM PS and use of 45 mg ribbons. Such a durable environmental catalyst with high efficiency presents great potential in practical wastewater remediation applications. The sustainability and stability of a superior catalyst is a particularly valuable attribute in environmental water remediation.

FIGS. 19A to 19D show the effects of other experimental parameters and corresponding discussions. The wastewater treatment based on this Fenton-like reaction is normally influenced by various experimental conditions, such as catalyst dosage, peroxides concentration, light irradiation, and temperatures.

Figure 19B:
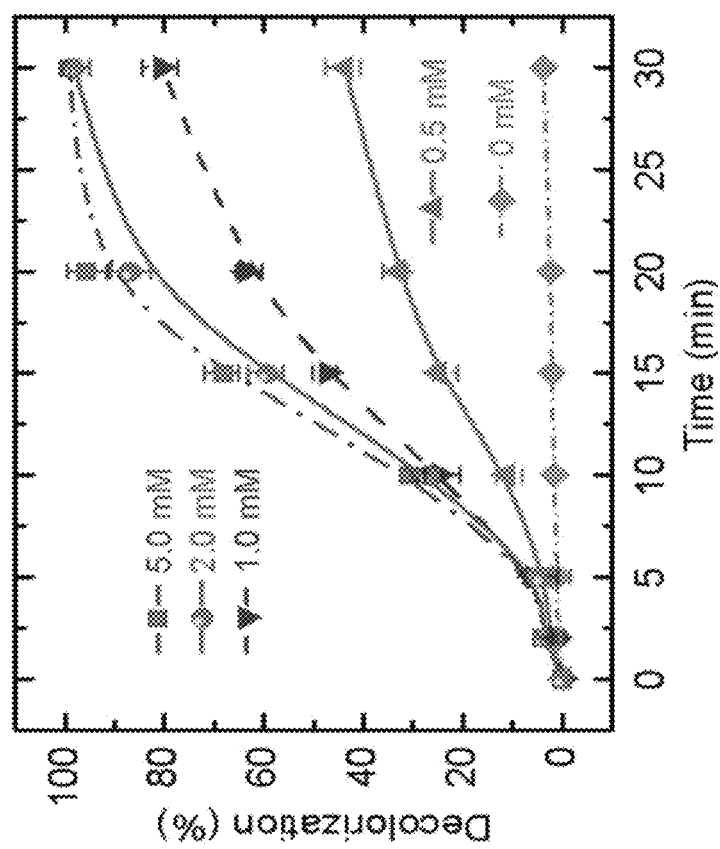
FIG. 19B is a graph showing the effect of persulfate concentration on rhodamine B degradation using the $Fe_{83}Si_2B_{11}P_3C_1$ catalyst of FIG. 4 to activate persulfate.
Figure 19A:
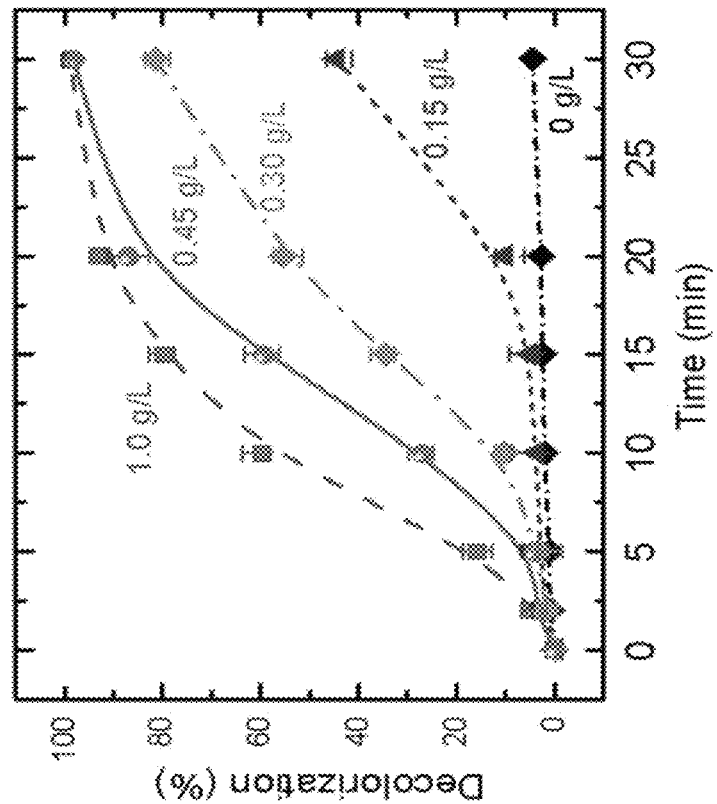
FIG. 19A is a graph showing the effect of catalyst dosage on rhodamine B degradation using the $Fe_{83}Si_2B_{11}P_3C_1$ catalyst of FIG. 4 to activate persulfate.

FIG. 19A shows that the dye degradation efficiency is nearly negligible when only adding 2 mM of persulfate. However, increasing the dosage of $Fe_{83}Si_2B_{11}P_3C_1$ MG catalyst from 0.15 g $L^{-1}$ to 1.0 g $L^{-1}$ could sharply enhance the dye degradation efficiency from 10% to more than 90% at 20 min, demonstrating the importance of MG catalysts.

FIG. 19B shows the effect of persulfate concentration on dye degradation efficiency. Noting that the chemical reactions without the inclusion of persulfate presents an extremely slow dye degradation efficiency even in 30 min, however, only slight addition of persulfate (0.5 to 2.0 mM) could dramatically promote the dye removal rate, indicating the important function of the generated radicals in the Fenton-like system.

Figure 19D:
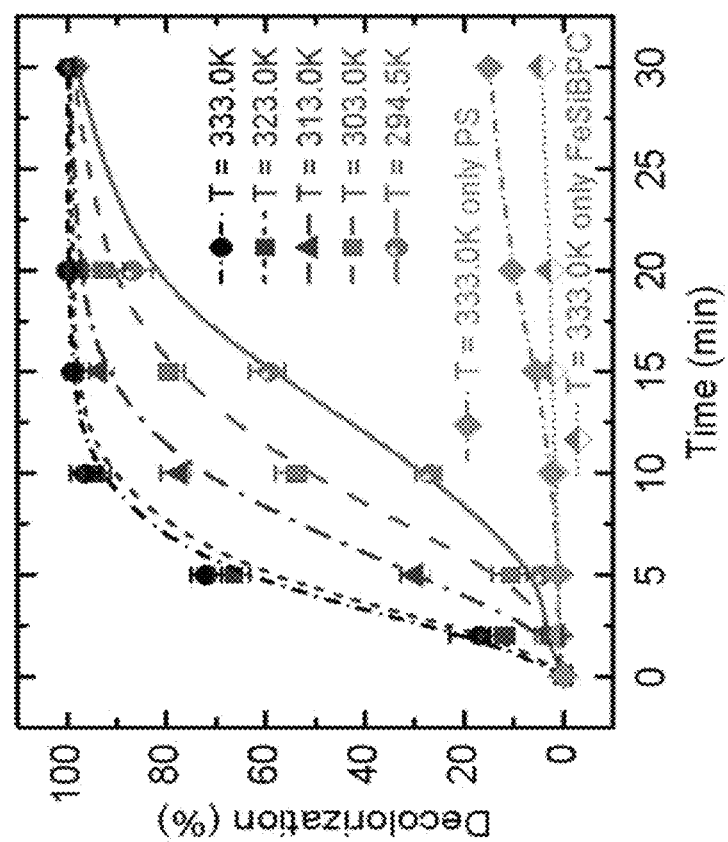
FIG. 19D is a graph showing the effect of temperature on rhodamine B degradation using the $Fe_{83}Si_2B_{11}P_3C_1$ catalyst of FIG. 4 to activate persulfate.
Figure 19C:
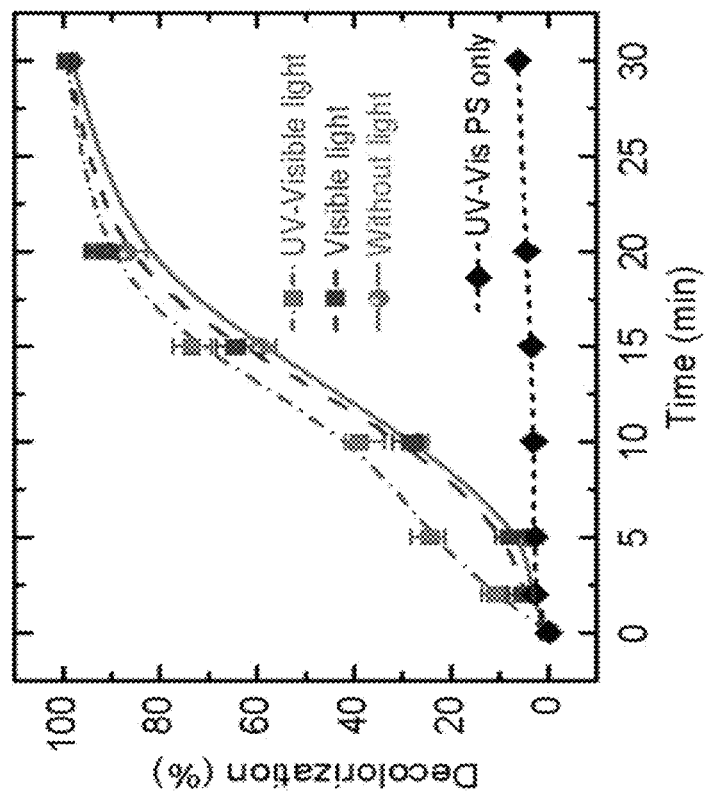
FIG. 19C is a graph showing the effect of UV-Visible light intensity on rhodamine B degradation using the $Fe_{83}Si_2B_{11}P_3C_1$ catalyst of FIG. 4 to activate persulfate.

FIG. 19C shows the effect of UV-Visible light intensity on rhodamine B degradation. The slight enhancement posed by the UV-Visible light intensity in the catalytic process due to the persulfate could be solely activated by UV or heat, however, considering the cost-effectiveness in practical application, such tiny improvement is nearly negligible.

FIG. 19D presents the effect of temperature on dye degradation efficiency. It can be seen that the only addition of persulfate or metallic glass catalysts presents a very slow catalytic efficiency even at high temperature (333.0 K). When both of persulfate and metallic glass catalysts included, the synergistic effects of temperature play an important function for the dye degradation owing to the provided external energy can help the reaction to rapidly pass the catalytic reaction barrier.

It is well accepted that the narrow pH range (2-5) is one of the most important restrictions for Fenton/Fenton-like reactions. In this invention, the inventors have investigated various dye aqueous solutions (rhodamine B, methylene blue, methylene orange and mixed solution) with different initial pH values. All the dyes are completely decolorized and mineralized without considering the pH adjustment, demonstrating a great potential and universality in the environmental wastewater remediation.

Figure 20:
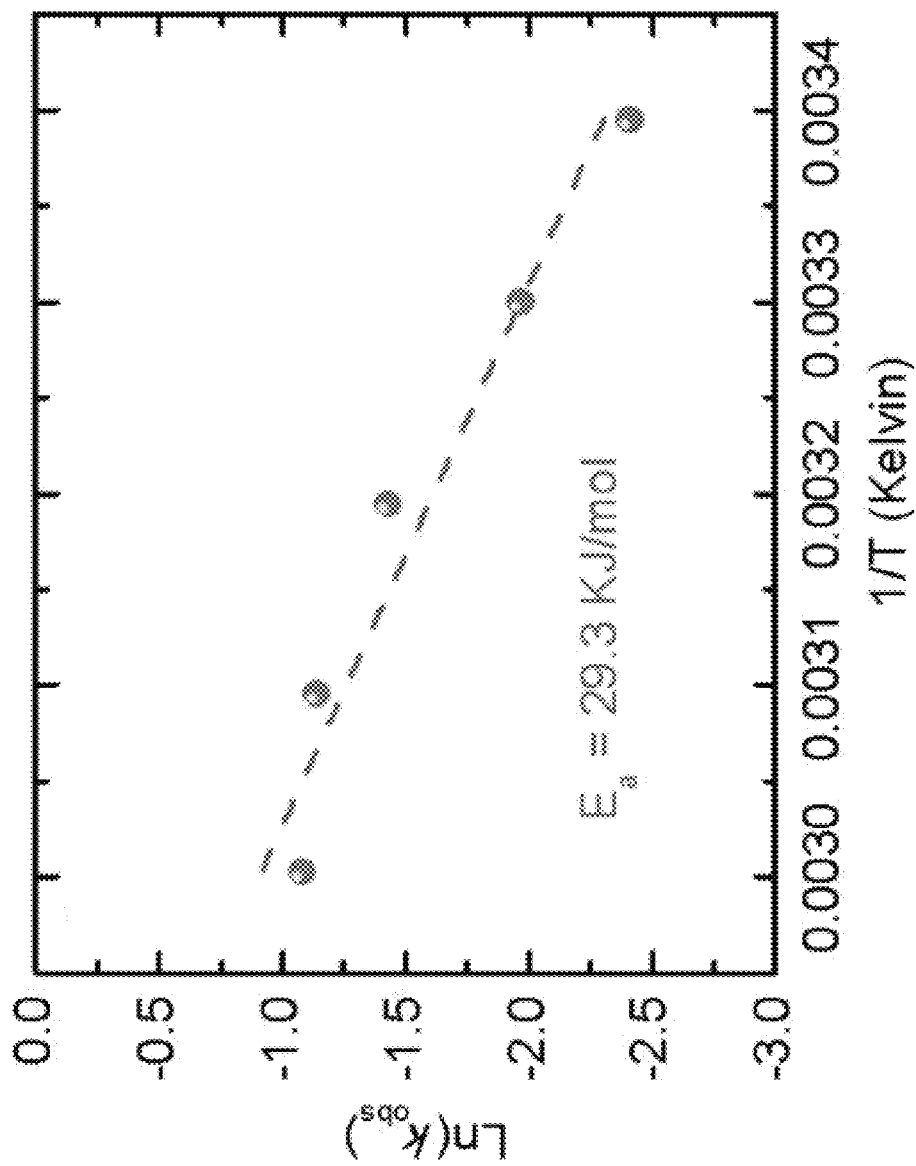
FIG. 20 is an Arrhenius plot for the calculation of the activation energy using the $Fe_{83}Si_2B_{11}P_3C_1$ catalyst of FIG. 4 to activate persulfate.

FIG. 20 is an Arrhenius plot for the calculation of the activation energy ($E_a$). Activation energy is an intrinsic kinetic characteristic of environmental catalysts for catalytic reactions and offers significant clues to explicate whether more or less energy is required to pass the catalytic reaction barrier. To calculate this value, $E_a$ is fitted to the Arrhenius equation in one example embodiment of the present invention as shown below:

$$\ln k_{obs} = -E_a/R_g T + \ln A$$

where $k_{obs}$ is the kinetic rate at different temperatures (T), $R_g$ is the gas constant, and A is a pre-exponential factor. The calculated $E_a$ value of the $Fe_{83}Si_2B_{11}P_3C_1$ metallic glass is 29.3 kJ mol$^{-1}$, demonstrating a much lower $E_a$ value than the crystalline metal-based catalysts (60-250 kJ mol$^{-1}$). From the potential-energy perspective, compared to the crystals, the supercooled glassy alloys with a nonequilibrium metastable nature are always in the top position with relatively greater Gibbs' free energy, and thus they are more potentially energetic to occur in the chemical reaction.

The inventors have devised that the inclusion of phosphorus in the iron-based metallic glass can significantly improve its conductivity, which is one of the most important parameters to design metallic glass catalysts for the wastewater treatment. In order to demonstrate the superior conductivity of $Fe_{83}Si_2B_{11}P_3C_1$ metallic glass, a metallic glass with an amorphous structure and smooth surface with an atomic component of $Fe_{78}Si_9B_{13}$ is also manufactured for comparison by melt-spinning method with reference to FIG. 3.

Figure 21:
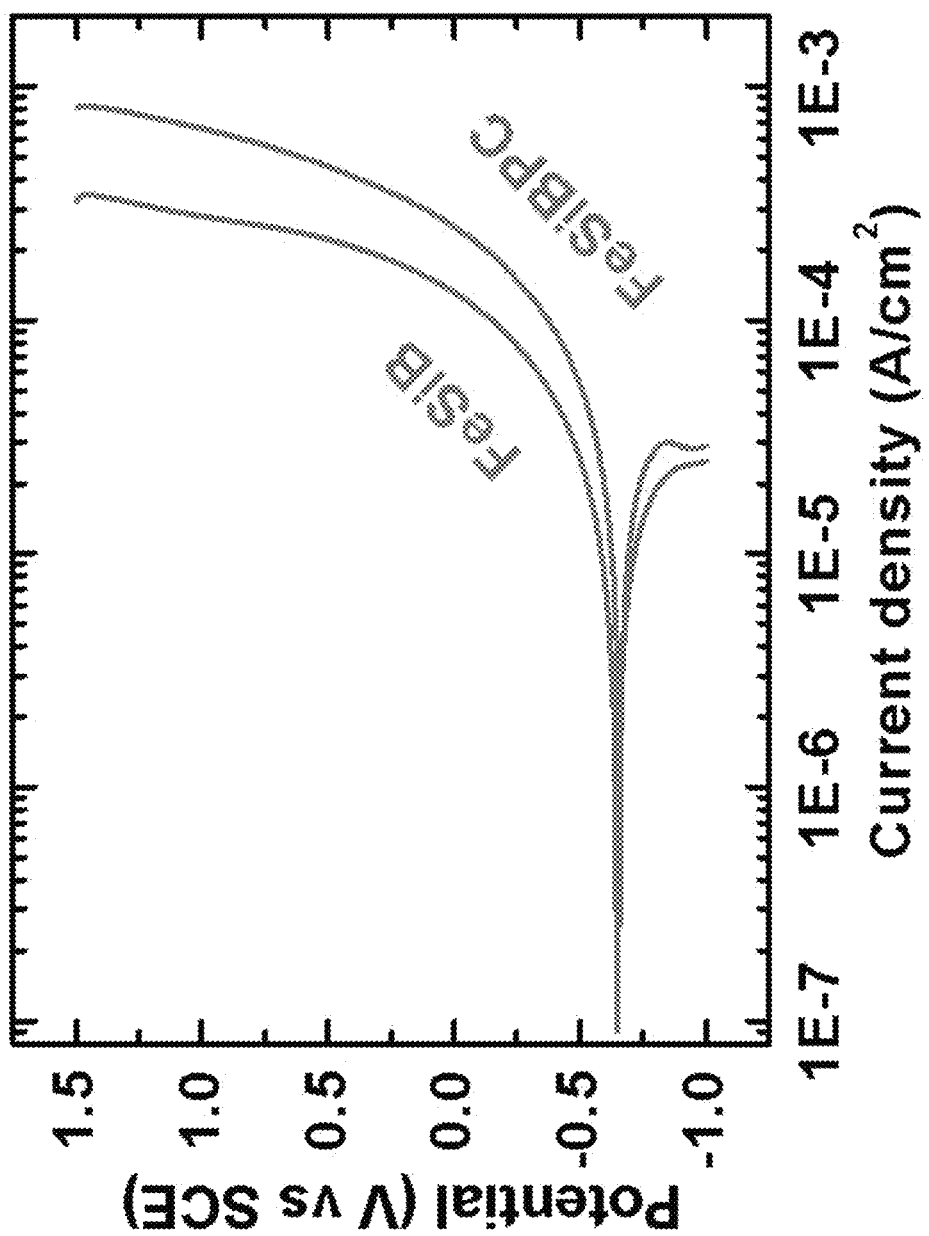
FIG. 21 shows a comparison of polarization curves between the $Fe_{83}Si_2B_{11}P_3C_1$ catalyst of FIG. 4 and $Fe_{78}Si_9B_{13}$ metallic glasses fabricated using the method of FIG. 3.
Figure 22:
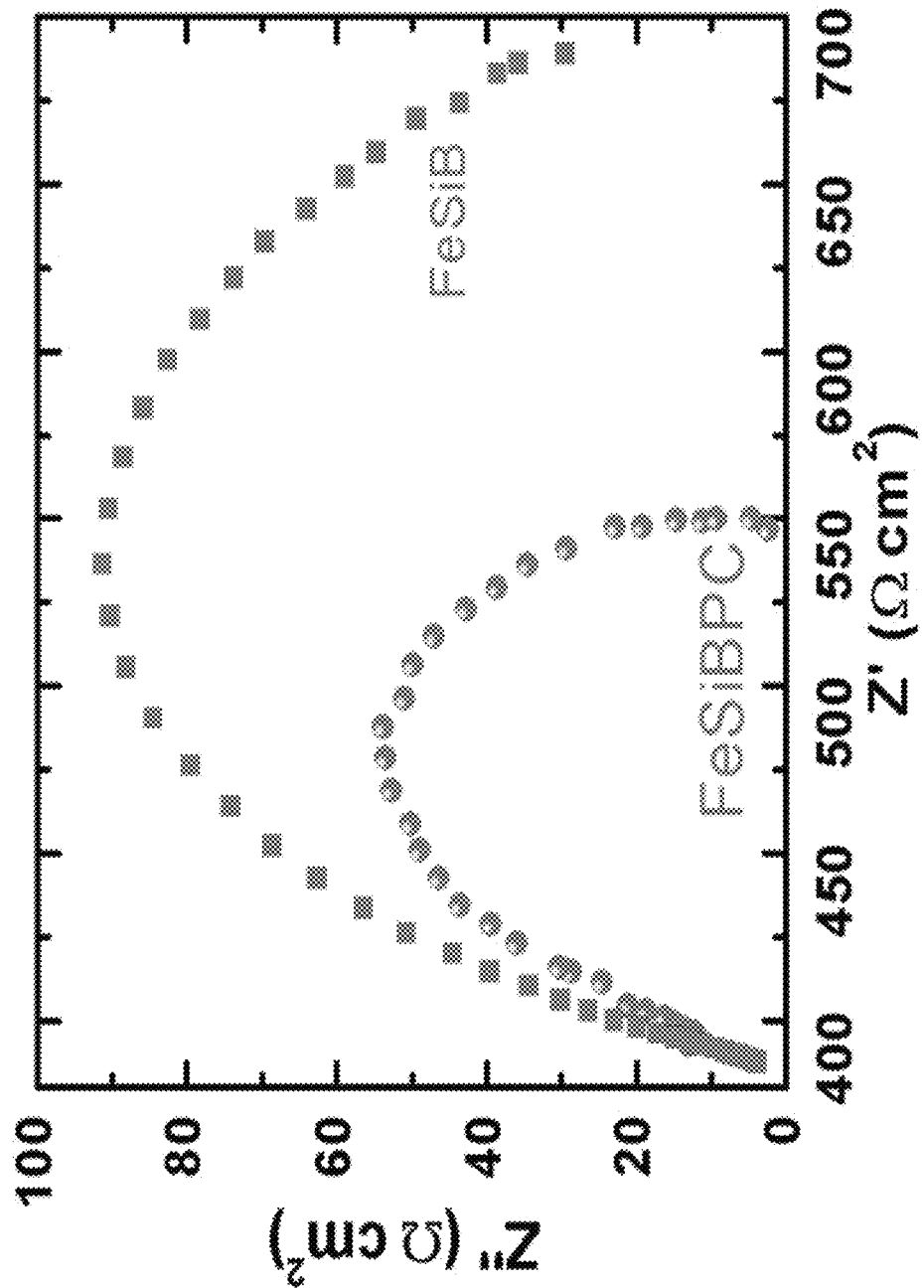
FIG. 22 shows a comparison of EIS measurements between the $Fe_{83}Si_2B_{11}P_3C_1$ catalyst of FIG. 4 and the $Fe_{78}Si_9B_{13}$ metallic glasses of FIG. 21.
Figure 23:
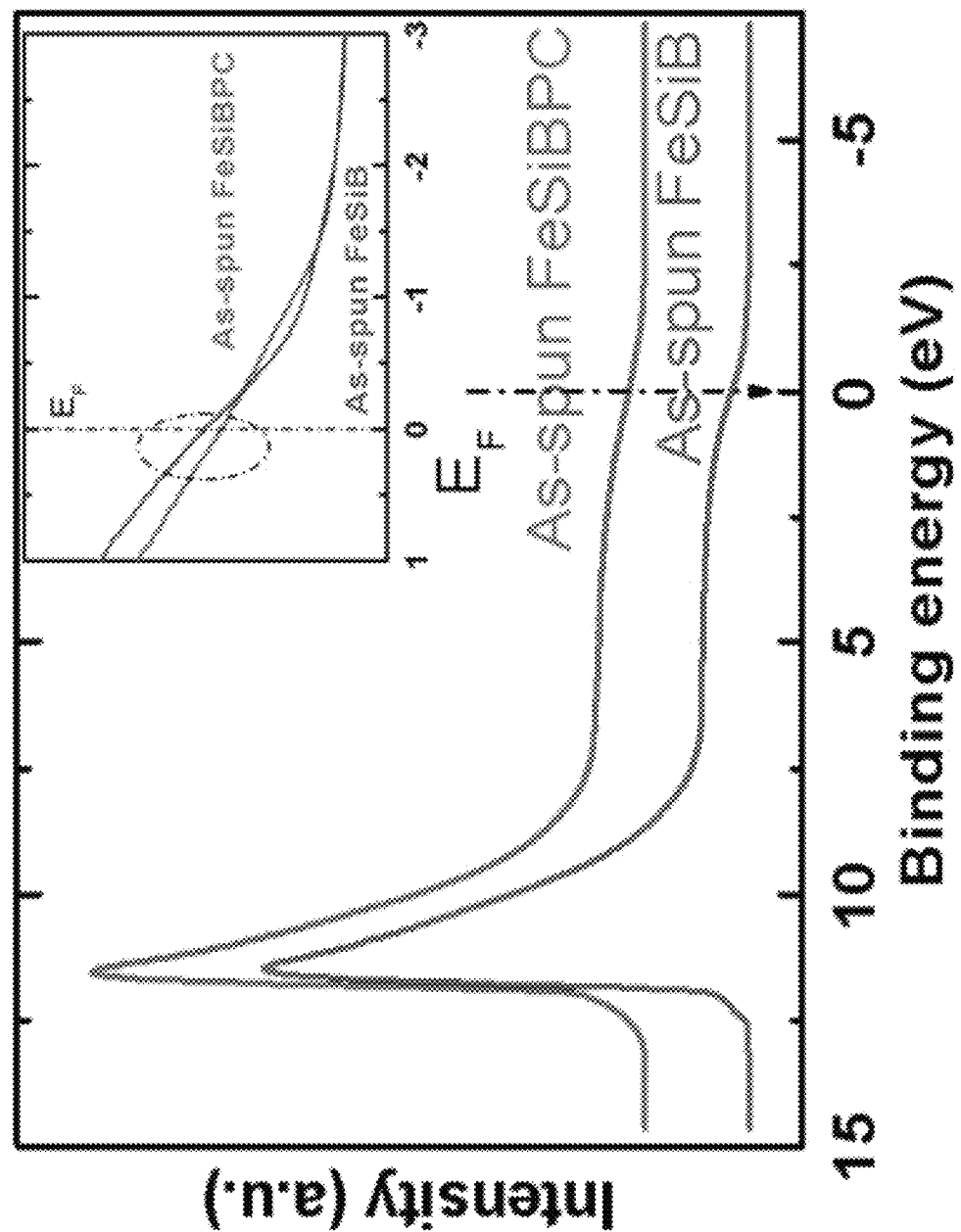
FIG. 23 shows a comparison of UPS measurements between the $Fe_{83}Si_2B_{11}P_3C_1$ catalyst of FIG. 4 and the $Fe_{78}Si_9B_{13}$ metallic glasses of FIG. 21.

FIGS. 21 to 23 show the comparisons between the $Fe_{83}Si_2B_{11}P_3C_1$ metallic glass and the $Fe_{78}Si_9B_{13}$ metallic glass. It is noteworthy that the $Fe_{83}Si_2B_{11}P_3C_1$ glassy ribbons in the present invention provide higher catalytic activity compared to other Fe-based MG catalysts. Such outstanding performance is owing to the $Fe_{83}Si_2B_{11}P_3C_1$ catalysts with a higher electronic delocalization state to cause stronger electron transfer capability based on lower intensity at Fermi level ($E_F$) in ultraviolet photoelectron spectroscopy (UPS) (FIG. 21), higher corrosion current density at the same corrosion potential in polarization curves (FIG. 22), and smaller semicircle diameter in electrochemical impedance spectroscopy (EIS) (FIG. 23) characterizations, respectively. As described herein, the excellent efficiency of the MG catalysts is ascribed to a unique atomic coordination that causes an electronic delocalization with an enhanced electron transfer.

FIG. 21 shows the comparison of polarization curves between $Fe_{83}Si_2B_{11}P_3C_1$ and $Fe_{78}Si_9B_{13}$ metallic glasses. It is observed that the $Fe_{83}Si_2B_{11}P_3C_1$ metallic glass with a higher corrosion current density at the same corrosion potential in polarization curves, demonstrating the chemical reactivity is easier to be occurred during the wastewater treatment process.

The inventors also conducted an electrochemical impedance spectroscopy (EIS) characterization for $Fe_{83}Si_2B_{11}P_3C_1$ and $Fe_{78}Si_9B_{13}$ metallic glasses to demonstrate their electron transfer ability, as shown in FIG. 22. A smaller semicircle diameter is observed for the $Fe_{83}Si_2B_{11}P_3C_1$ metallic glass in the EIS measurement, indicating the $Fe_{83}Si_2B_{11}P_3C_1$ metallic glass has a stronger electron transfer capability during the wastewater treatment process.

In order to further reveal the electronic structures of the $Fe_{83}Si_2B_{11}P_3C_1$ and $Fe_{78}Si_9B_{13}$ metallic glasses, an ultraviolet photoelectron spectroscopy (UPS) was carried out as shown in FIG. 23. It can be seen that a lower intensity at Fermi level ($E_F$) is observed for the $Fe_{83}Si_2B_{11}P_3C_1$ metallic glasses, indicating the $Fe_{83}Si_2B_{11}P_3C_1$ metallic glass with a higher electronic delocalization state to cause stronger electron transfer capability.

Figure 24A:
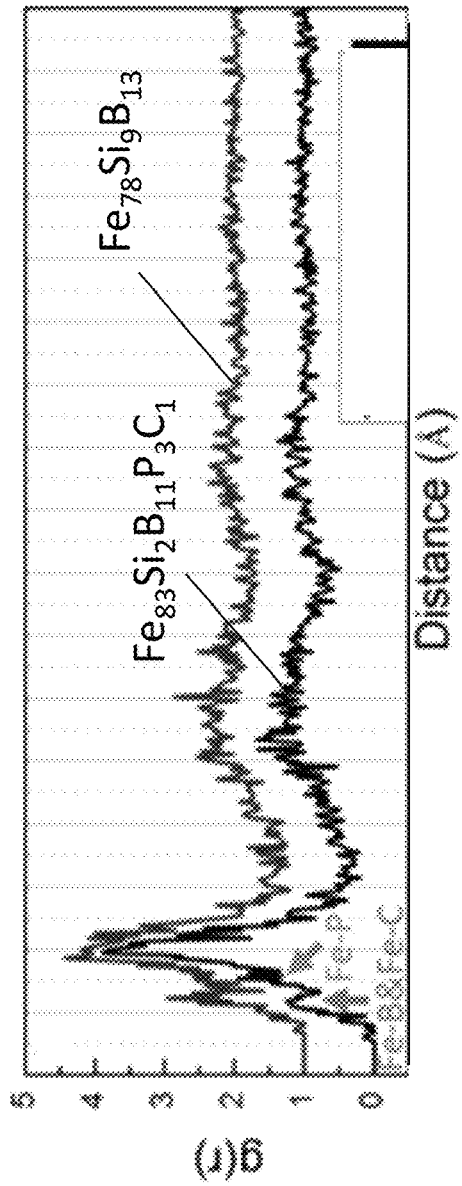
FIG. 24A shows a comparison of total radial distribution functions between the $Fe_{83}Si_2B_{11}P_3C_1$ catalyst of FIG. 4 and the $Fe_{78}Si_9B_{13}$ metallic glasses of FIG. 21.
Figure 24B:
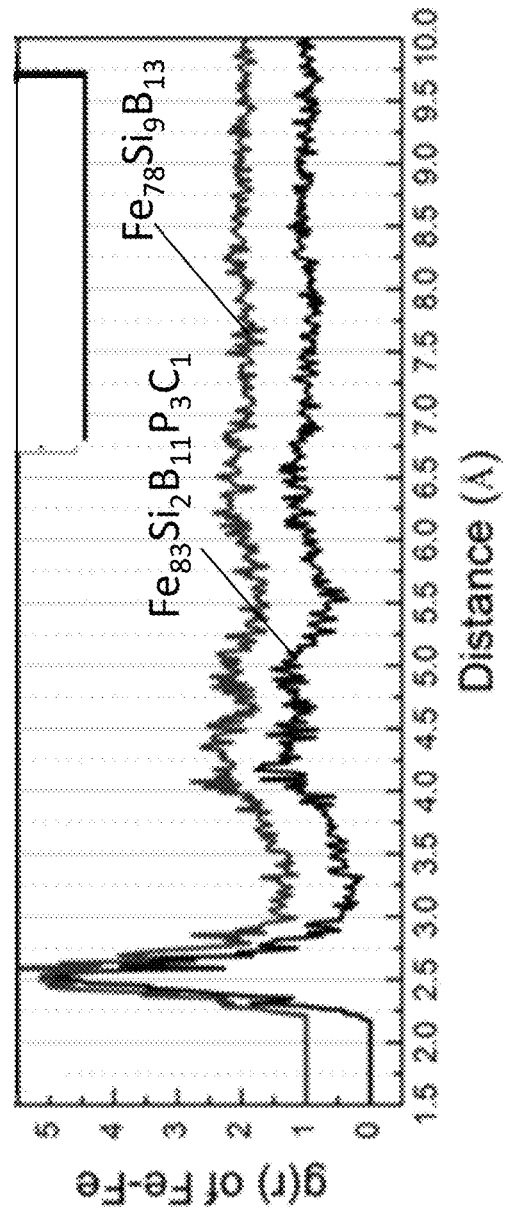
FIG. 24B shows a comparison of partial radial distribution functions between the $Fe_{83}Si_2B_{11}P_3C_1$ catalyst of FIG. 4 and the $Fe_{78}Si_9B_{13}$ metallic glasses of FIG. 21.

To further elucidate the high conductivity of the $Fe_{83}Si_2B_{11}P_3C_1$ MG catalysts, the atomic configurations and electronic structures of the MG catalysts based on first-principles simulations are demonstrated. The total radial distribution function (RDF) information in FIGS. 24A and 24B indicates that the phosphorus (P) and carbon (C) atoms are only coordinated with iron (Fe) atoms to form Fe—P and Fe—C bonds, and no atomic coordination with silicon (Si) and boron (B) is observed. The elemental P with proper electronegativity and a medium-range atomic distance of 2.25 Å with Fe atoms is able to stabilize the Fe atoms in the amorphous state so that they have high conductivity and electron transfer ability, and that the electric potential differences among various atomic bonds can further facilitate self-activated galvanic cells.

Figure 25B:
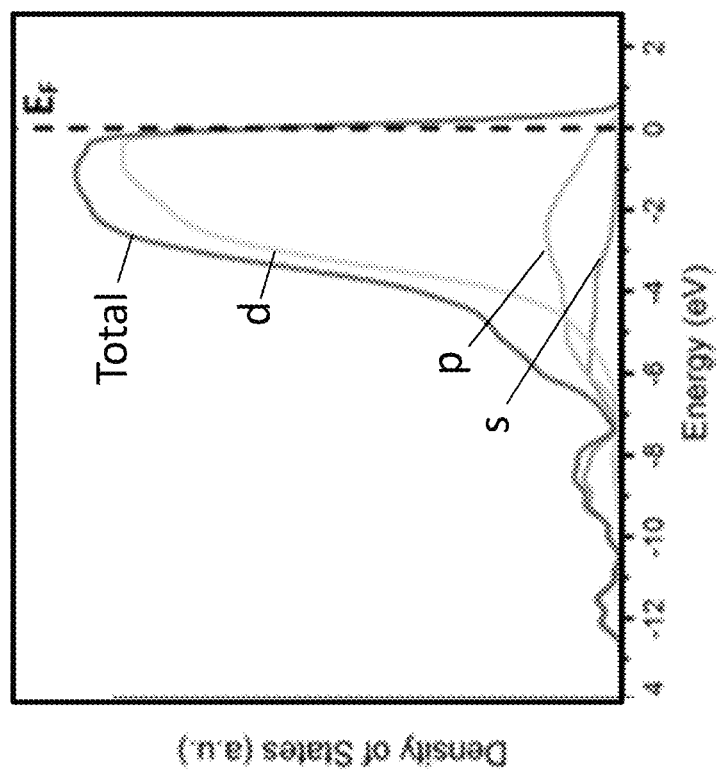
FIG. 25B shows the electronic density of states of the $Fe_{83}Si_2B_{11}P_3C_1$ catalyst of FIG. 4.
Figure 25A:
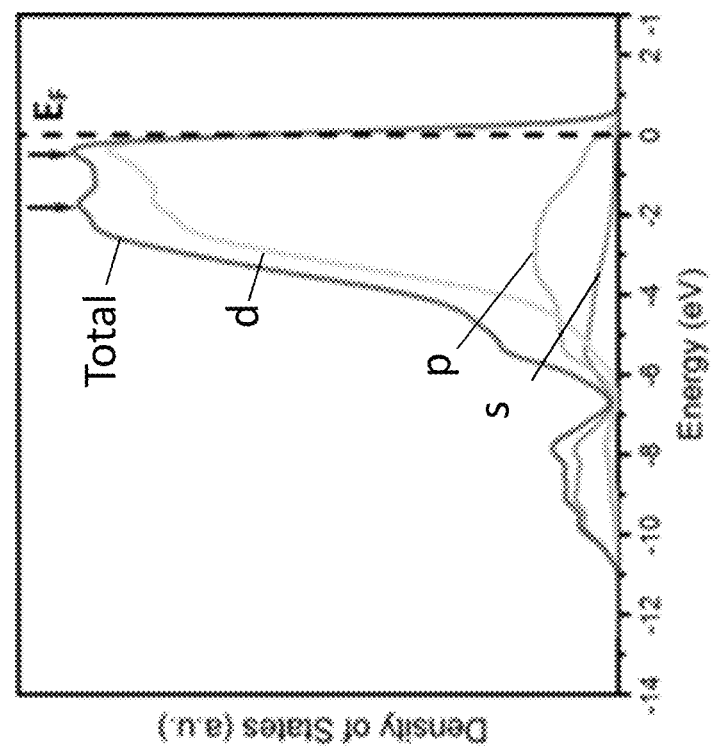
FIG. 25A shows the electronic density of states of the $Fe_{78}Si_9B_{13}$ metallic glasses of FIG. 21.

In addition, FIGS. 25A and 25B show that the electronic density of states (DOS) of $Fe_{83}Si_2B_{11}P_3C_1$ MGs present a flatter pattern near the EF region, which is in good accordance with the results of UPS analysis (FIG. 23), evidencing their stronger electronic delocalization state with higher conductivity.

Figures 26A, 26B, 26C:
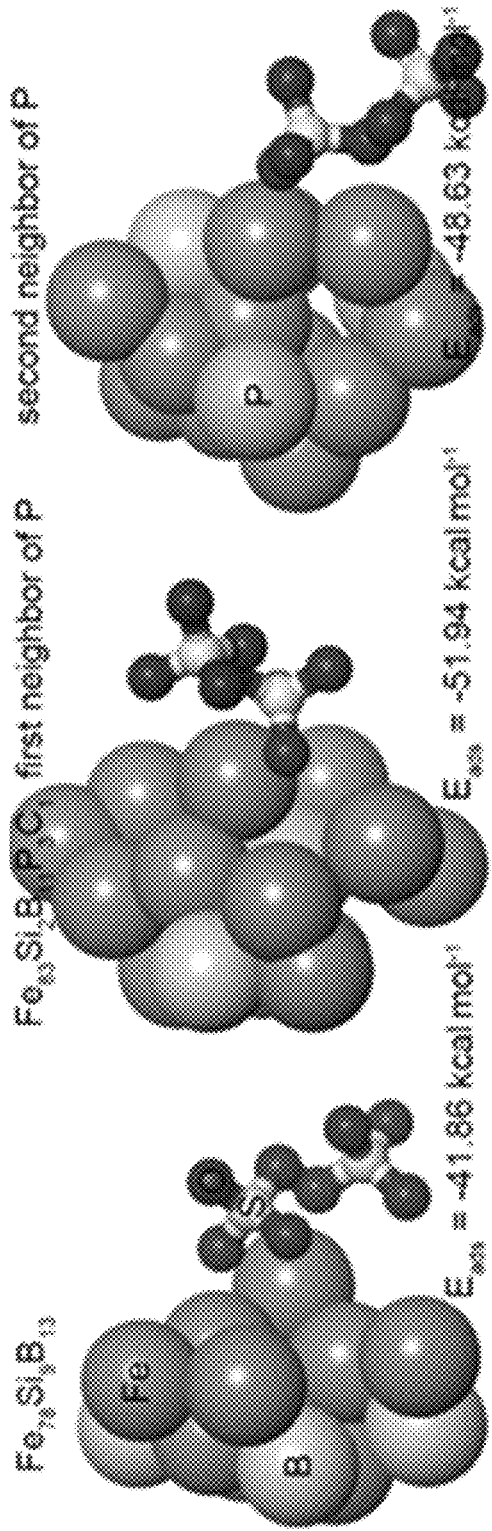
FIG. 26A shows the local coordination environment of Fe adsorption sites of the $Fe_{78}Si_9B_{13}$ metallic glasses of FIG. 21.
FIG. 26B shows the local coordination environment of Fe adsorption sites of the $Fe_{83}Si_2B_{11}P_3C_1$ catalyst of FIG. 4, with a first neighbour of P atom.
FIG. 26C shows the local coordination environment of Fe adsorption sites of the $Fe_{83}Si_2B_{11}P_3C_1$ catalyst of FIG. 4, with a second neighbour of P atom.

As shown in FIGS. 26A to 26C, the adsorption energies ($E_{ads}$) and the corresponding local coordination environment of Fe sites were further studied by the simulations of combining the Adsorption Locator and Forcite programs in Materials Studio. It is noted that the local adsorption sites of Fe, either containing first ($E_{ads}$=−51.94 kcal mol$^{-1}$) or second ($E_{ads}$=−48.63 kcal mol$^{-1}$) neighbor of P atoms, are more energetic for the PS adsorption compared to the adsorption sites of Fe in $Fe_{78}Si_9B_{13}$ ($E_{ads}$=−41.86 kcal mol$^{-1}$). This indicates that the addition of P atoms globally densifies the atomic packing configuration, and can further promote the presence of local Fe sites at surface. Such results further evidence that the addition of P atoms in the present invention plays significant effect on electron delocalization for the enhancement of catalytic performance.

Figure 27:
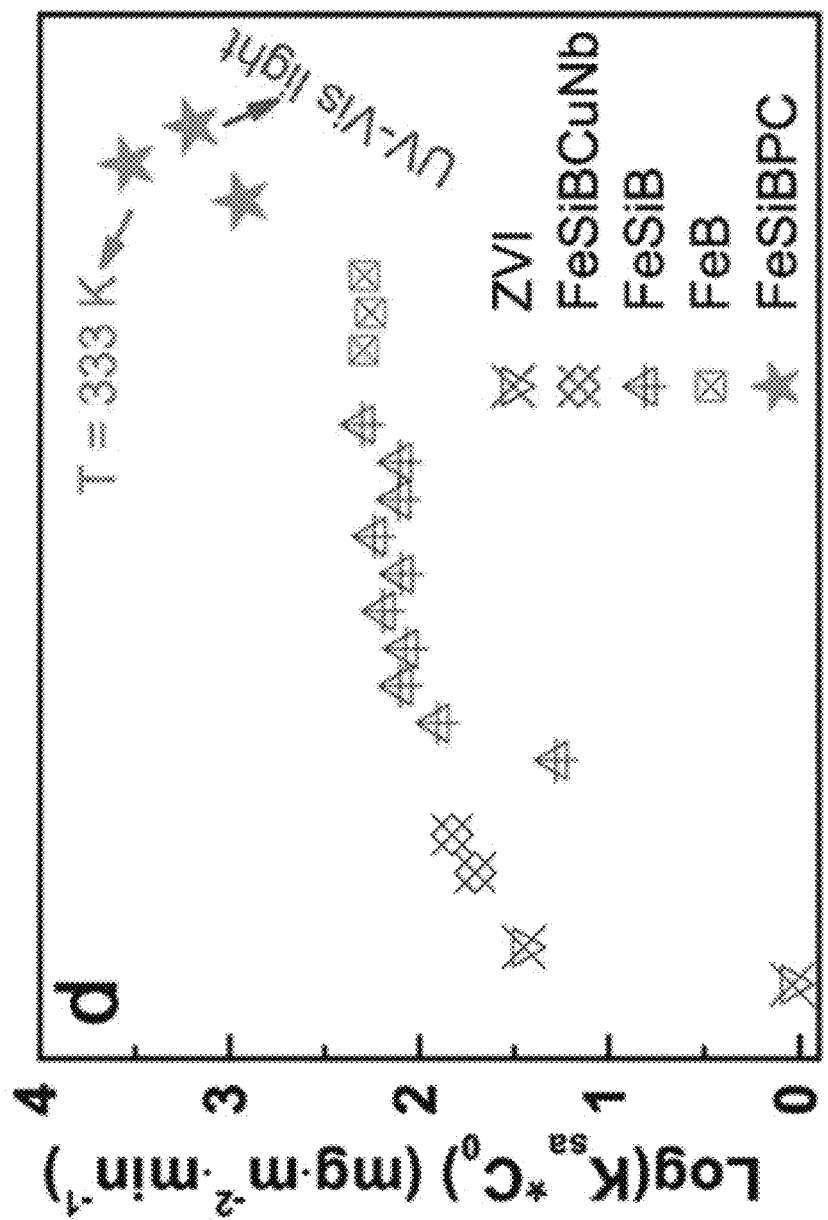
FIG. 27 shows a comparison of dye degradation ability of Fe-based metallic catalysts.

FIG. 27 demonstrates comparable results of the dye degradation ability of the $Fe_{83}Si_2B_{11}P_3C_1$ MG catalysts and other Fe-based catalysts. Typically, the dye degradation capability of an environmental catalyst is correlated to its specific surface area and initial dye concentration with the reaction rates ($k_{obs}$, which is fitted to the pseudo-first-order kinetic model, $\ln(C_0/C) = k_{obs} t$, where $C_0$ is the initial concentration of dye at t=0 and C is the dye concentration at time t) due to the fact that the heterogeneous catalytic reaction is based on the surface reaction. As shown in FIG. 27, although the crystalline zero-valence irons (ZVIs) in powders/nanopowders form have a higher specific surface area, the Fe-based MG catalysts are still in a higher position than the ZVIs.

Figure 28:
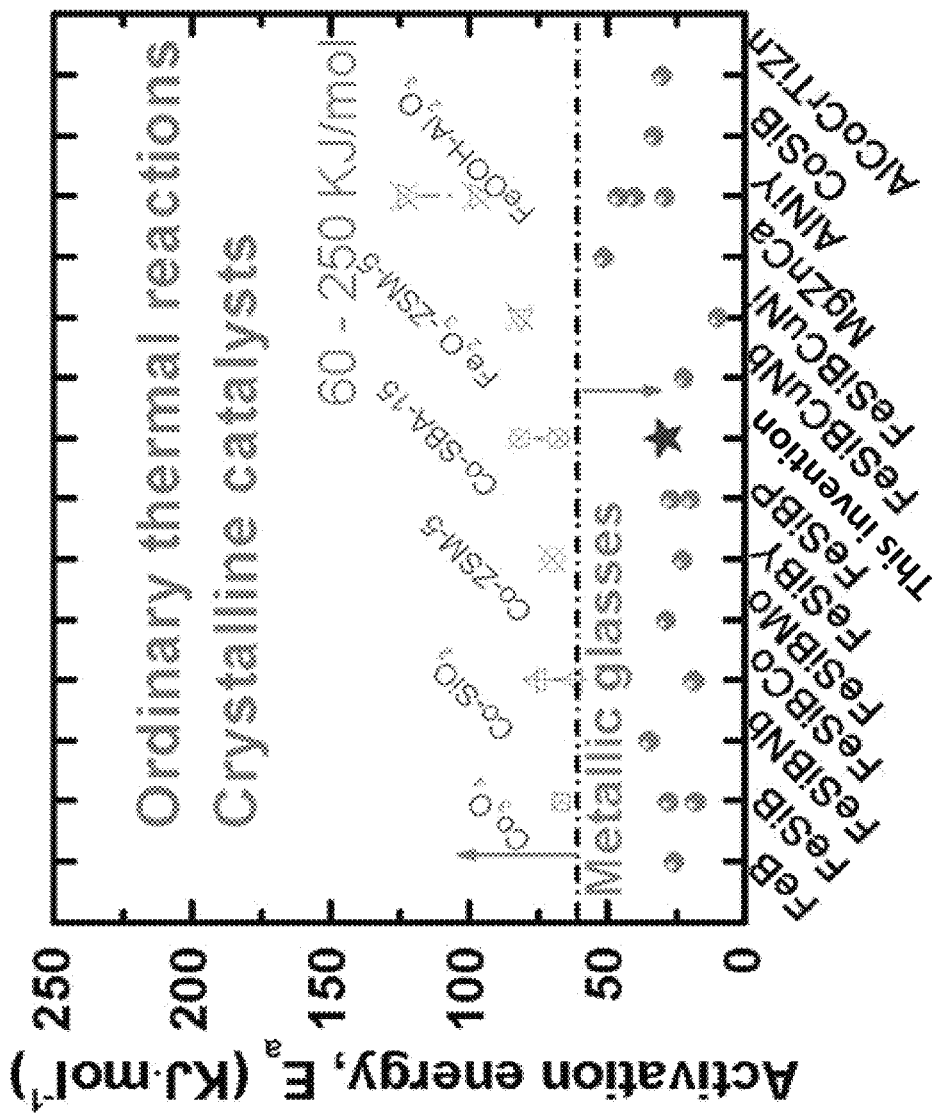
FIG. 28 shows a comparison of activation energies using Fe-based metallic catalysts.

With reference to FIG. 28, the achieved $E_a$ value of metallic glass catalysts with various elemental components is in the range of less than 60 kJ mol$^{-1}$ (the $E_a$ of $Fe_{83}Si_2B_{11}P_3C_1$ metallic glass catalysts in this invention is 29.3 kJ mol$^{-1}$), demonstrating a much lower $E_a$ value than the crystalline metal-based catalysts (60-250 kJ mol$^{-1}$). From the potential-energy perspective, compared to the crystals, the supercooled glassy alloys with a non-equilibrium metastable nature are always in the top position with relatively greater Gibbs' free energy, and thus they are more potentially energetic to occur in the chemical reaction.

Figure 29:
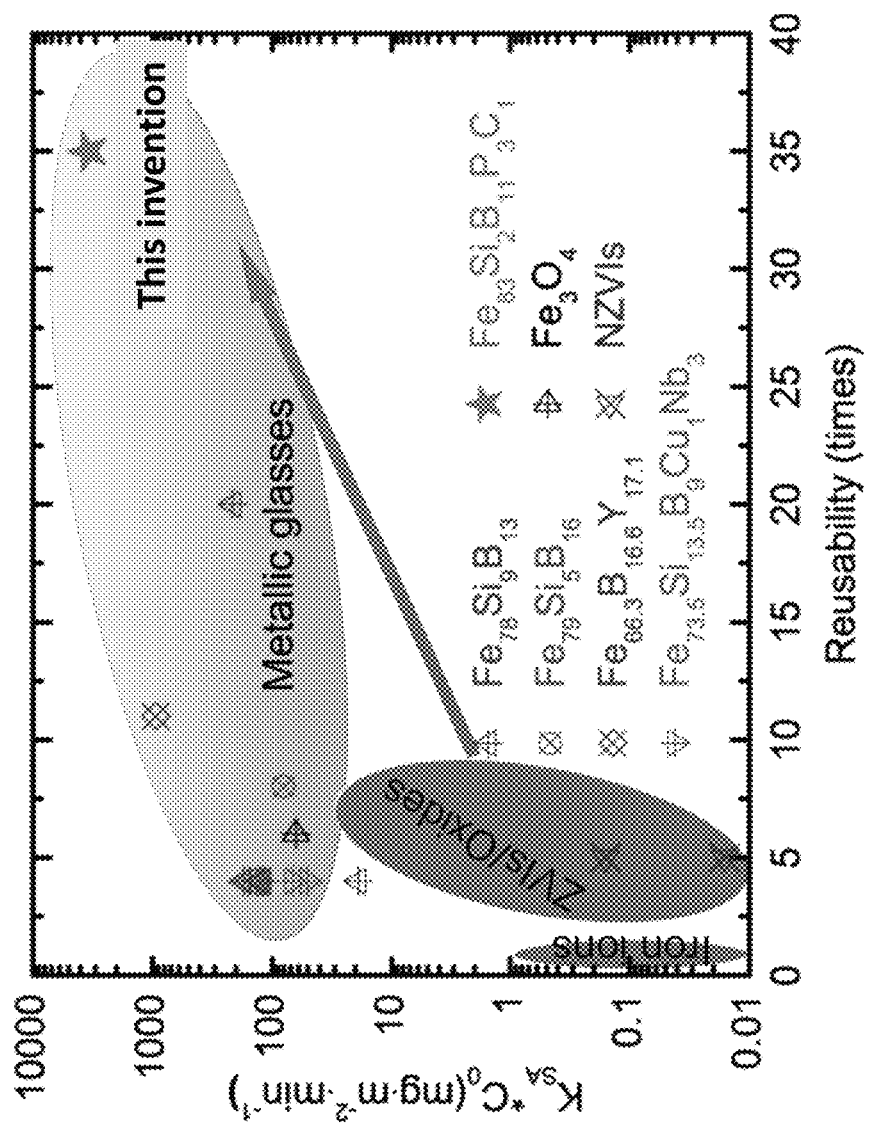
FIG. 29 shows a comparison of wastewater treatment performance using Fe-based metallic catalysts.

FIG. 29 shows a comparison of wastewater treatment performance using Fe-based metallic catalysts. To further highlight the excellent catalytic performance of the $Fe_{83}Si_2B_1P_3C_1$ metallic glass catalyst in the present invention, comparable results of degradation capability versus reusability for various ion states, as well as for amorphous and crystalline Fe-based catalysts are summarized.

The iron ions, including ferrous ($Fe^{2+}$) or ferric ($Fe^{3+}$) ions, have been largely utilized as standard industrial Fenton-like catalysts due to their highly active homogeneous reaction. However, the ion-state Fe-based catalysts with restricted reusability (one-time usage; see bottom left-hand area of FIG. 29) and the produced iron sludge secondary pollution have gradually become a main impediment to their rapid development in industrial technologies. Comparatively, the ZVIs and iron-based oxides with the superiorities of low-cost, high efficiency, and large surface area have been reported as the iterative Fenton catalysts.

However, due to the limitations of structural defects in crystals (e.g., pitting/grain-boundary corrosion, high electric resistivity owing to large grain boundaries, and fast surface decay), the reliability and efficiency of these crystalline catalysts is very constrained. As shown in FIG. 29, the reported reusability of crystalline Fe-based Fenton catalysts is within 10 times.

Compared with the ion-state and crystalline alternatives, the recent iron-based MG catalysts provide a higher essential treating ability and more enhanced stability when degrading organic pollutants. The $Fe_{83}Si_2B_{11}P_3C_1$ metallic glass in the present invention belongs to the greatest performance group, with both ultrahigh essential treating ability and a reusability of ~35 times with high degradation and mineralization efficiency for wastewater pollutant, and without efficiency decay.

In addition, the present $Fe_{83}Si_2B_{11}P_3C_1$ metallic glass is a facile, low-cost, highly efficient, and durable environmental metallic glass catalyst. It is also easy to be recycled due to the presence of Fe, which is a magnetic material. Through slightly adding the metallic glass catalysts and persulfate in wastewater pollutants, the treatment performance, including efficiency and reusability, can be significantly enhanced. The $Fe_{83}Si_2B_{11}P_3C_1$ metallic glass can be directly employed as environmental catalysts for wastewater treatment without any additional conditions (e.g., temperature, UV/Vis irradiation, and electric field), demonstrating great advances in the aspects of green, facile, low-cost, and efficient wastewater remediation.

The present invention also provides a new strategy for designing high-performance non-noble metallic catalysts with respect to structural evolution and alteration of electronic properties, as well as a facile and simple fabricating process for the $Fe_{83}Si_2B_{11}P_3C_1$ catalyst which can be manufactured in a large-scale industrial production.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A catalyst comprising an amorphous metallic glass matrix; and a surface layer including a cover layer and an amorphous interlayer, wherein the surface layer covers the amorphous metallic glass matrix and the cover layer comprises a porous structure having porous channels sized to permit a persulfate or peroxymonosulfate to pass therethrough so as to contact the amorphous interlayer whereby, upon contact, a catalytic reaction transforms a portion of the amorphous interlayer into the porous structure of the cover layer, and wherein the portion transformed is transformed from an amorphous phase to a nanocrystalline phase; and
    wherein the atomic component of the amorphous metallic glass matrix consists essentially of:
    iron: 60-85%;
    silicon: 0-20%:
    boron: 0-20%:
    phosphorus: 1-20%; and
    carbon: 0-10%.

2. The catalyst in accordance with claim 1, wherein the surface layer has an iron content and the amorphous metallic glass matrix has an iron content, and the iron content of the surface layer is lower than the iron content in the amorphous metallic glass matrix.

3. The catalyst in accordance with claim 1, wherein the surface layer has an oxide content and the amorphous matrix has an oxide content, and the oxide content of the surface layer is higher than the oxide content in the amorphous matrix.

4. The catalyst in accordance with claim 1, wherein the catalyst comprises a material composition that gradually changes from the amorphous metallic glass matrix to the surface layer.

5. The catalyst in accordance with claim 1, wherein the amorphous interlayer comprises a dense amorphous structure having an atomic density higher than the atomic density of the cover layer.

6. The catalyst in accordance with claim 1, wherein the amorphous interlayer comprises a plurality of adsorption sites arranged to facilitate occurrence of the catalytic reaction.

7. The catalyst in accordance with claim 6, wherein the plurality of adsorption sites comprises a plurality of Fe sites each containing a first neighbor P atom or a first neighbor P atom and a second neighbor P atom.

8. The catalyst in accordance with claim 6, wherein the persulfate or the peroxymonosulfate operate as a treatment reagent for treating a target substance, and wherein the target substance is treated by the treatment reagent upon activation by the catalyst.

9. The catalyst in accordance with claim 8, wherein the metallic glass matrix activates the treatment reagent at the amorphous interlayer by transforming the treatment reagent into radicals of the treatment reagent.

10. The catalyst in accordance with claim 8, wherein the target substance includes waste water pollutants.

11. The catalyst in accordance with claim 1, further wherein the catalyst is substantially flat in shape.

12. The catalyst in accordance with claim 1, further having a thickness of about 10 μm to about 80 μm.

13. A method of fabricating a catalyst in accordance with claim 1, comprising the steps of:
    melting an alloy comprising iron and phosphorous to form a melted alloy;
    melt-spinning the melted alloy to form an amorphous structure of comprising the amorphous metallic glass matrix; and exposing the amorphous metallic glass matrix to persulfate or peroxymonosulfate to transform a portion of the amorphous metallic glass matrix to form the surface layer.

14. The method in accordance with claim 13, wherein the melting step comprises arc-melting the alloy.

15. The method in accordance with claim 13, wherein the melting step comprises the step of further melting the melted alloy in a quartz crucible.

16. The method in accordance with claim 15, wherein the further melting step is conducted at a temperature of from about 1200° C. to about 1500° C.

17. The method in accordance with claim 15, wherein the melt-spinning step further comprises the step of ejecting the further melted alloy onto a rotating copper roll surface.

18. The method in accordance with claim 17, wherein the rotating copper roll surface moves at a speed of from about 23 $ms^{-1}$ to about 39 $ms^{-1}$.

19. The method in accordance with claim 17, further comprising the step of rapidly quenching the further melted alloy ejected onto the rotating copper roll surface.

20. The method in accordance with claim 13, wherein the catalyst is substantially flat in shape.

21. The method in accordance with claim 13, wherein the catalyst has a thickness of about 10 μm to about 80 μm.

22. A method for treating wastewater comprising the step of utilizing the catalyst of claim 1 in wastewater.

23. The catalyst of claim 1, wherein the amorphous metallic glass matrix has the formula $Fe_{83}Si_2B_{11}P_3C_1$.

* * * * *